US010350940B2

(12) United States Patent
Zeisler

(10) Patent No.: US 10,350,940 B2
(45) Date of Patent: Jul. 16, 2019

(54) AIRCRAFT WHEEL ASSEMBLY

(71) Applicant: Parker-Hannifin Corporation, Cleveland, OH (US)

(72) Inventor: Joseph Zeisler, Grafton, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 359 days.

(21) Appl. No.: 15/153,270

(22) Filed: May 12, 2016

(65) Prior Publication Data

US 2017/0274989 A1 Sep. 28, 2017

Related U.S. Application Data

(60) Provisional application No. 62/311,493, filed on Mar. 22, 2016.

(51) Int. Cl.
*B64C 25/34* (2006.01)
*B60B 23/10* (2006.01)
*B60B 25/04* (2006.01)
*B64C 25/36* (2006.01)
*B60B 3/08* (2006.01)
*B60B 25/00* (2006.01)

(52) U.S. Cl.
CPC ............. *B60B 23/10* (2013.01); *B60B 25/04* (2013.01); *B64C 25/36* (2013.01); *B60B 3/085* (2013.01); *B60B 25/002* (2013.01); *B60B 2320/14* (2013.01)

(58) Field of Classification Search
CPC ....... B60B 25/002; B60B 25/16; B60B 23/10; B60B 25/04; B60B 25/36; B60B 25/34
See application file for complete search history.

(56) References Cited

U.S. PATENT DOCUMENTS

| | | | | |
|---|---|---|---|---|
| 1,433,279 A | * | 10/1922 | Howell | B60B 25/16 152/413 |
| 1,710,614 A | * | 4/1929 | Furrer | B60B 25/08 152/409 |
| 2,105,317 A | * | 1/1938 | Frank | B60B 3/08 188/218 R |
| 3,695,728 A | * | 10/1972 | Haussels | B60B 3/08 301/64.706 |
| 3,930,683 A | | 1/1976 | MacKeown | |
| 5,833,324 A | | 11/1998 | Conradsson | |
| 6,074,126 A | | 6/2000 | Hunter et al. | |
| 6,561,591 B2 | * | 5/2003 | Zimet | A47L 9/009 301/5.1 |
| 6,786,259 B2 | | 9/2004 | Vehar et al. | |

(Continued)

*Primary Examiner* — S. Joseph Morano
*Assistant Examiner* — Scott A Browne
(74) *Attorney, Agent, or Firm* — Renner, Otto, Boisselle & Sklar, LLP

(57) ABSTRACT

An aircraft wheel assembly that includes first and second hub components having an axis and respective first and second sets of circumferentially spaced apart interface elements. The first and second hub components may be rotatable relative to one another about the axis between a first position and a second position. In the first position, the first set of interface elements is axially movable relative to the second set of interface elements. In the second position the first set of interface elements axially overlaps the second set of interface elements to prevent axial movement of the first hub component relative to the second hub component.

27 Claims, 22 Drawing Sheets

(56) References Cited

U.S. PATENT DOCUMENTS

| | | | |
|---|---|---|---|
| 7,083,238 B2 * | 8/2006 | Clements | B60B 23/10 |
| | | | 152/396 |
| 7,546,910 B2 | 6/2009 | Thorp et al. | |
| 8,833,694 B2 | 9/2014 | Gilleran et al. | |
| 2012/0248855 A1 | 10/2012 | Shamo | |

* cited by examiner

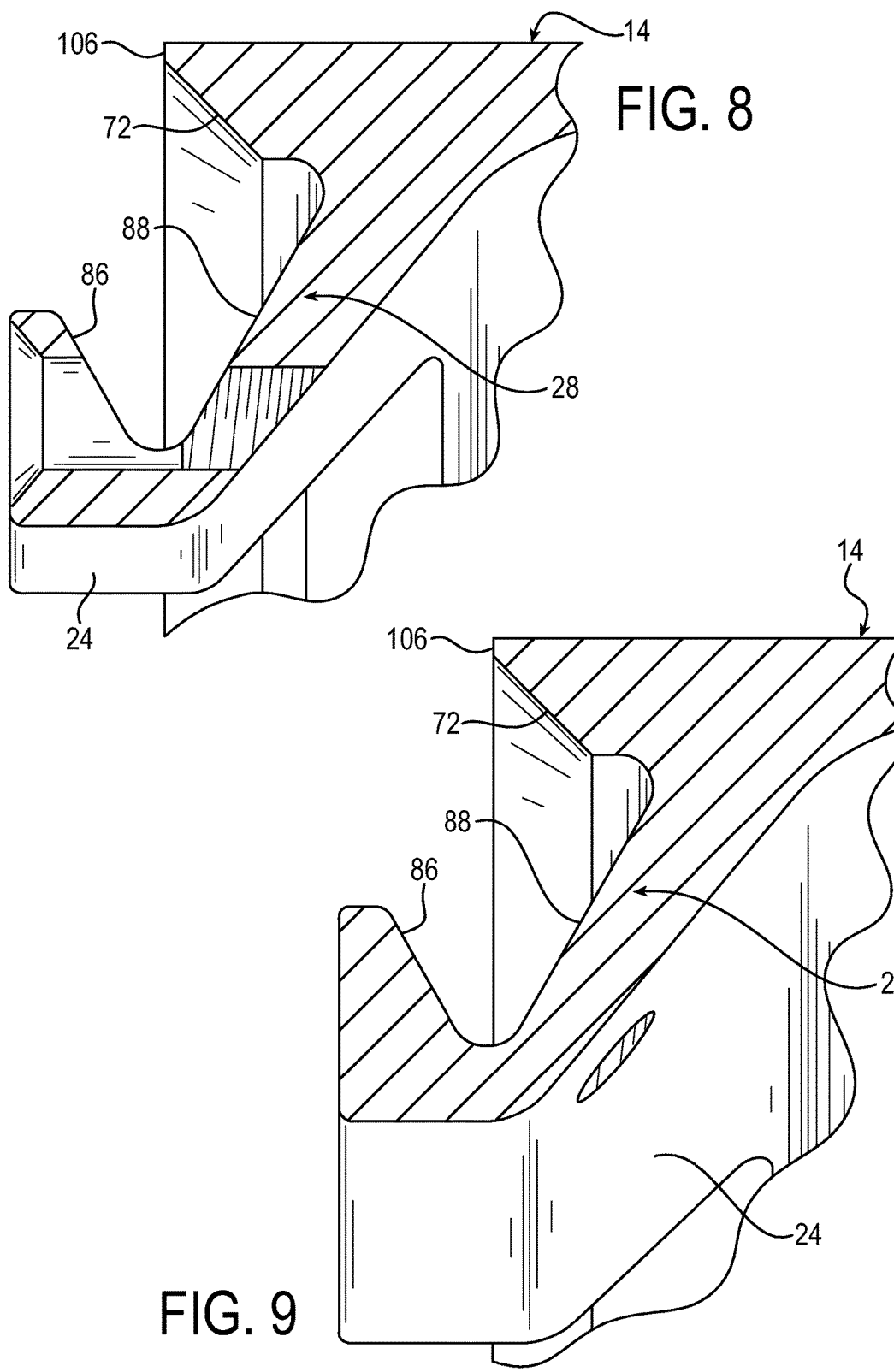

AIRCRAFT WHEEL ASSEMBLY

RELATED APPLICATIONS

This application claims the benefit of U.S. Provisional Application No. 62/311,493 filed Mar. 22, 2016, which is hereby incorporated herein by reference.

FIELD OF INVENTION

The present invention relates generally to aircraft wheel assemblies, and more particularly to aircraft wheel assembly retention systems.

BACKGROUND

Aircraft wheel assemblies that employ a multi part construction, whether a two part or three part divided wheel assembly, typically utilize a retention system in which bolts and/or locking rings retain the divided wheel components. Some existing retention systems have various shortcomings, drawbacks, and disadvantages relative to certain applications. For example, the bolt and ring retention systems require secondary structural elements, that is the bolts and/or retaining rings, to react tire loads and pressure between the primary divided wheel components. Such retention systems may require complex assembly or an undesirable amount of maintenance time and cost. Accordingly, there remains a need for further contributions in this area of technology.

SUMMARY OF INVENTION

The present invention is directed to an aircraft wheel assembly in which the primary wheel components have interface elements that serve as a retention system. According to one aspect of the invention, an aircraft wheel assembly includes first and second hub components having an axis and respective first and second sets of circumferentially spaced apart interface elements. The first and second hub components are rotatable relative to one another about the axis between a first position in which the first set of interface elements is axially movable relative to the second set of interface elements and a second position in which the first set of interface elements axially overlaps the second set of interface elements to prevent axial movement of the first hub component relative to the second hub component.

Embodiments of the invention may include one or more of the following additional features separately or in combination.

The aircraft wheel assembly may further include a lock that is configured to prevent rotational movement of the first hub component relative to the second hub component when the first and second hub components are in the second position.

The aircraft wheel assembly may include a lock including a pin.

The aircraft wheel assembly may include a pin that projects through openings in the interface elements.

The first and second sets of interface elements may form a male and female thread interface having a shallow helix angle.

The shallow helix angle may be zero degrees.

The first hub component may include an inboard wheel component and the second hub component may include an outboard wheel component.

Each of the first and second sets of interface elements may include four interface elements.

The interface elements of the first set of interface elements may be equally circumferentially spaced apart.

In the second position the first and second sets of interface elements may form a tongue and groove joint.

The first set of interface elements may include tongue interface elements and the second set of interface elements may include groove interface elements.

The first and second hub components may include respective third and fourth sets of circumferentially spaced apart interface elements.

In the first position the third set of interface elements may be axially movable relative to the fourth set of interface elements and in the second position the third set of interface elements may axially overlap the fourth set of interface elements to prevent axial movement of the first hub component relative to the second hub component.

The third and fourth sets of interface elements may respectively be axially staggered relative to the first and second sets of interface elements.

The third and fourth sets of interface elements may be respectively axially in the same plane as the first and second sets of interface elements.

The interface elements of the third set of interface elements may be radially opposed to the interface elements of the first set of interface elements.

The first and second hub components may include respective fifth and sixth sets of circumferentially spaced apart interface elements.

In the first position the fifth set of interface elements may be axially movable relative to the sixth set of interface elements and in the second position the fifth set of interface elements may axially overlap the sixth set of interface elements to prevent axial movement of the first hub component relative to the second hub component.

The fifth and sixth sets of interface elements may be respectively circumferentially staggered relative to the first and second sets of interface elements.

According to another aspect of the invention, an aircraft wheel assembly includes first and second wheel components having an axis and respective circumferentially disposed tongue and groove engaging portions. The tongue and groove engaging portions may be interconnectable to form circumferentially disposed tongue and groove joints that axially lock the first and second wheel components.

Embodiments of the invention may include one or more of the following additional features separately or in combination.

The groove engaging portions may be configured to slidably circumferentially receive therein the respective tongue portions.

The first wheel component may include an inboard wheel component and the second wheel component may include an outboard wheel component.

The tongue engaging portions may be on an inside diameter of the first wheel component and the groove engaging portions may be on an outside diameter of the second wheel component.

The tongue engaging portions may have a round shape in circumferential end view, and the grooves of the groove engaging portions may have a round shape in circumferential end view.

According to another aspect of the invention, a method of assembling an aircraft wheel may include moving a first set of circumferentially spaced apart interface elements of a first hub component axially relative to a second set of circumferentially spaced apart interface elements of a second hub component, and rotating the first hub component relative to the second hub component until the first set of interface elements axially overlaps the second set of interface elements to prevent axial movement of the first hub component relative to the second hub component.

Embodiments of the invention may include one or more of the following additional features separately or in combination.

The first and second sets of interface elements may be axially moved until the circumferentially spaced apart interface elements of the second hub component align in circumferential end view with the circumferentially spaced apart interface elements of the first hub component.

The first set of interface elements may include tongue interface elements and the second set of interface elements may include groove interface elements, and the rotating of the first hub component relative to the second hub component may include interconnecting the tongue and groove interface elements to form circumferentially spaced tongue and groove joints.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

FIG. 8 is an axial sectional view of an interface element portion of the FIG. 7 inboard wheel component as viewed from line 8-8 in FIG. 7.

FIG. 9 is an axial sectional view of an interface element portion of the FIG. 7 inboard wheel component as viewed from line 9-9 in FIG. 7.

DETAILED DESCRIPTION

Figure 1:
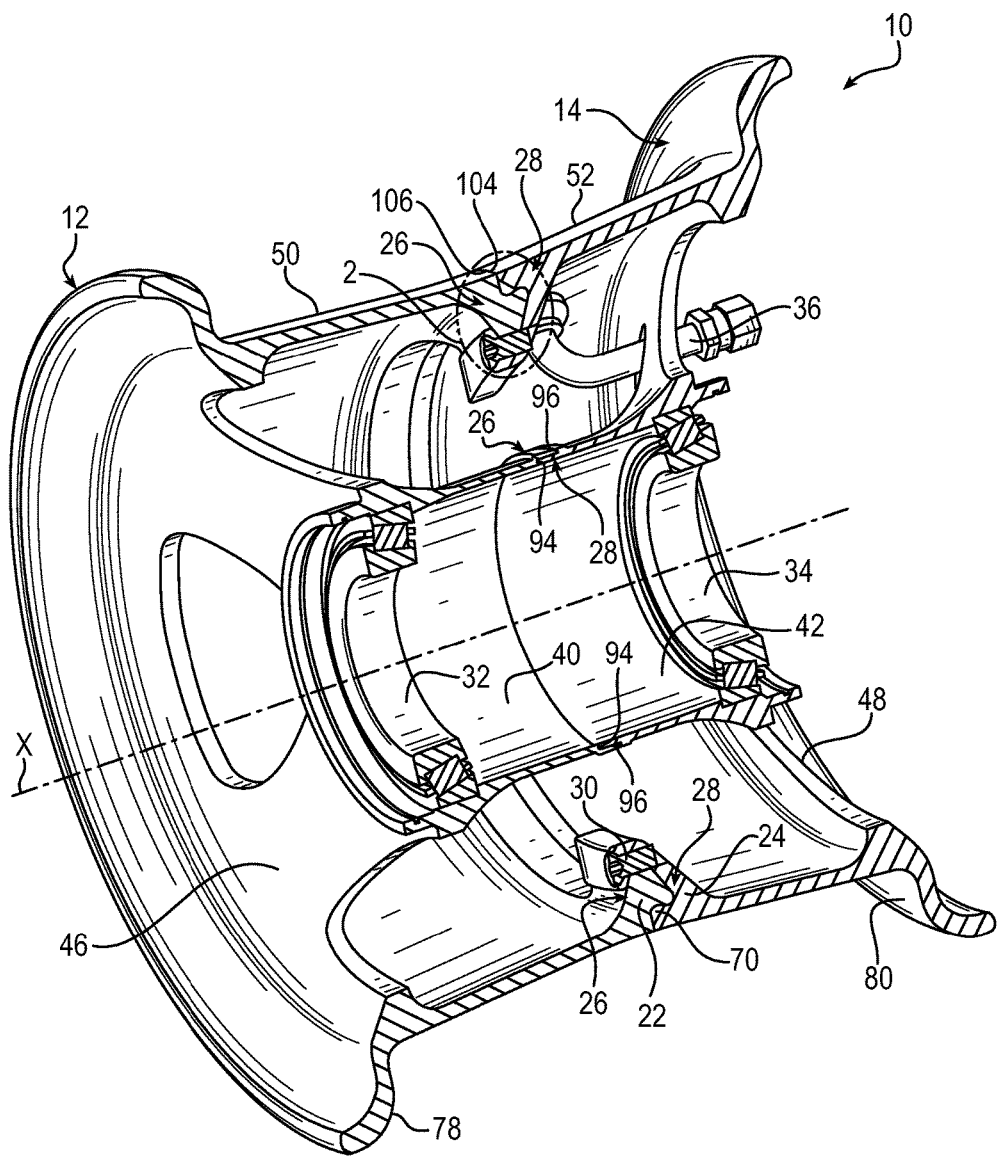
FIG. 1 is a perspective view of an exemplary aircraft wheel assembly according to the invention, with an angular portion removed to show cross section detail of the inboard and outboard wheel components.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

Figure 2:
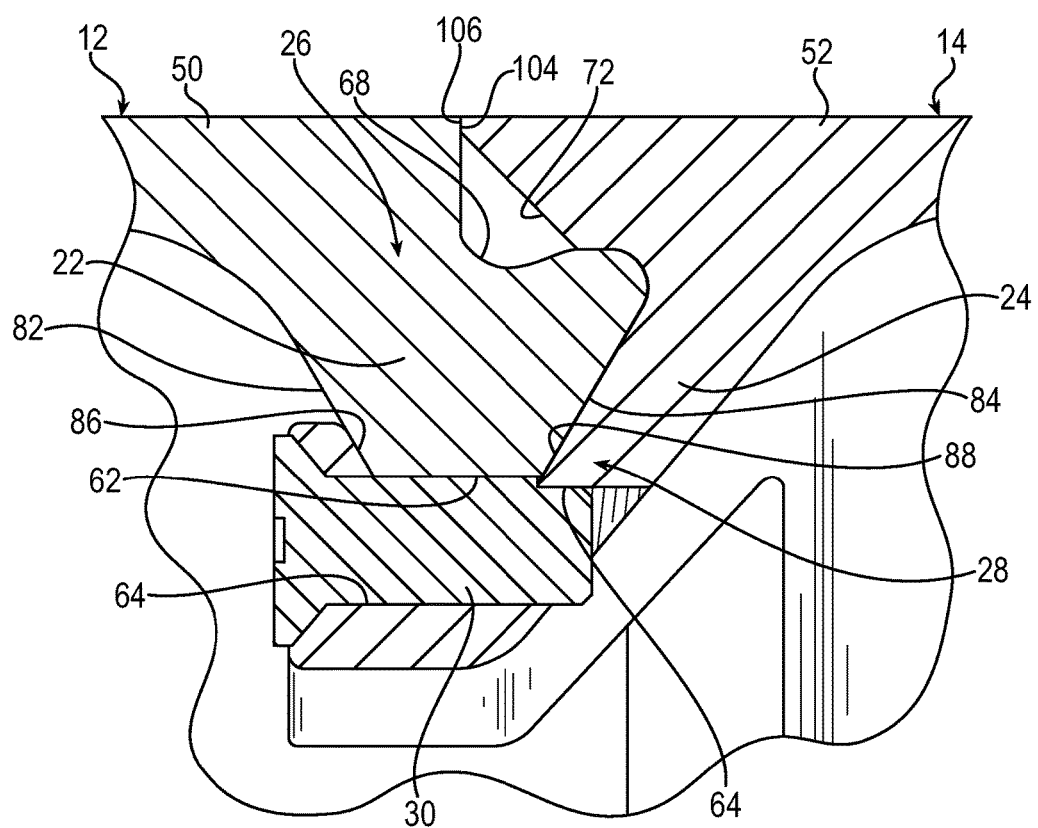
FIG. 2 is an axial sectional view of a portion of the aircraft wheel assembly of FIG. 1, as viewed from the dashed circle line labeled 2 in FIG. 1, showing the interface between components in greater detail.

FIGS. 1-10 show an aircraft wheel assembly 10 for mounting on an axle. The wheel assembly 10 includes an inboard primary wheel component 12, best shown in FIG. 3, and a separable outboard primary wheel component 14, best shown in FIG. 7, which together support a tire (not shown) thereon. The inboard wheel component 12 has a plurality of tongue interface elements 22 disposed circumferentially about an axis X of the wheel assembly 10 and shown in various axial cross sections in FIGS. 4-6. The outboard wheel component 14 has a plurality of groove interface elements 24 disposed circumferentially about the axis X, and shown in various axial cross sections in FIGS. 8-10. As shown in FIGS. 1 and 2, and as will be described in greater detail below, the interface elements 22, 24 form a tongue and groove arrangement that interconnects the primary wheel components 12, 14 at respective interface regions 26, 28.

With this interconnection, the interface elements 22, 24 serve to structurally retain the wheel components 12, 14 in fixed relation to one another.

FIG. 1 shows several components of the aircraft wheel assembly 10, including the inboard and outboard wheel components 12, 14, locking screw pins 30, respective inboard and outboard bearings 32, 34, and an inflation valve 36. As will be appreciated, the wheel assembly 10 is not limited to the particular components and configuration shown in FIG. 1, and other embodiments are contemplated. For example, instead of the two part divided wheel assembly that is illustrated in FIG. 1 the wheel assembly 10 may include a three part divided wheel assembly where inboard and outboard wheel components and a separate tubewell section constitute the primary components. Additionally, although locking screw pins 30 are illustrated as the clocking lock feature in the FIG. 1 wheel assembly 10, it will be appreciated that any of a myriad of clocking lock features may be used, such as pins, screws, ball detents, plug detents, edge alignment clips, or any combination of the foregoing. Further, in the FIG. 1 wheel assembly 10 the outboard wheel component 14 has provisions for the inflation valve 36. In another form, the inboard wheel component 12 may have such provisions. Where the wheel assembly 10 is a tube type wheel, the tube or either of the wheel components 12, 14 may provide for an inflation valve.

Figure 3:
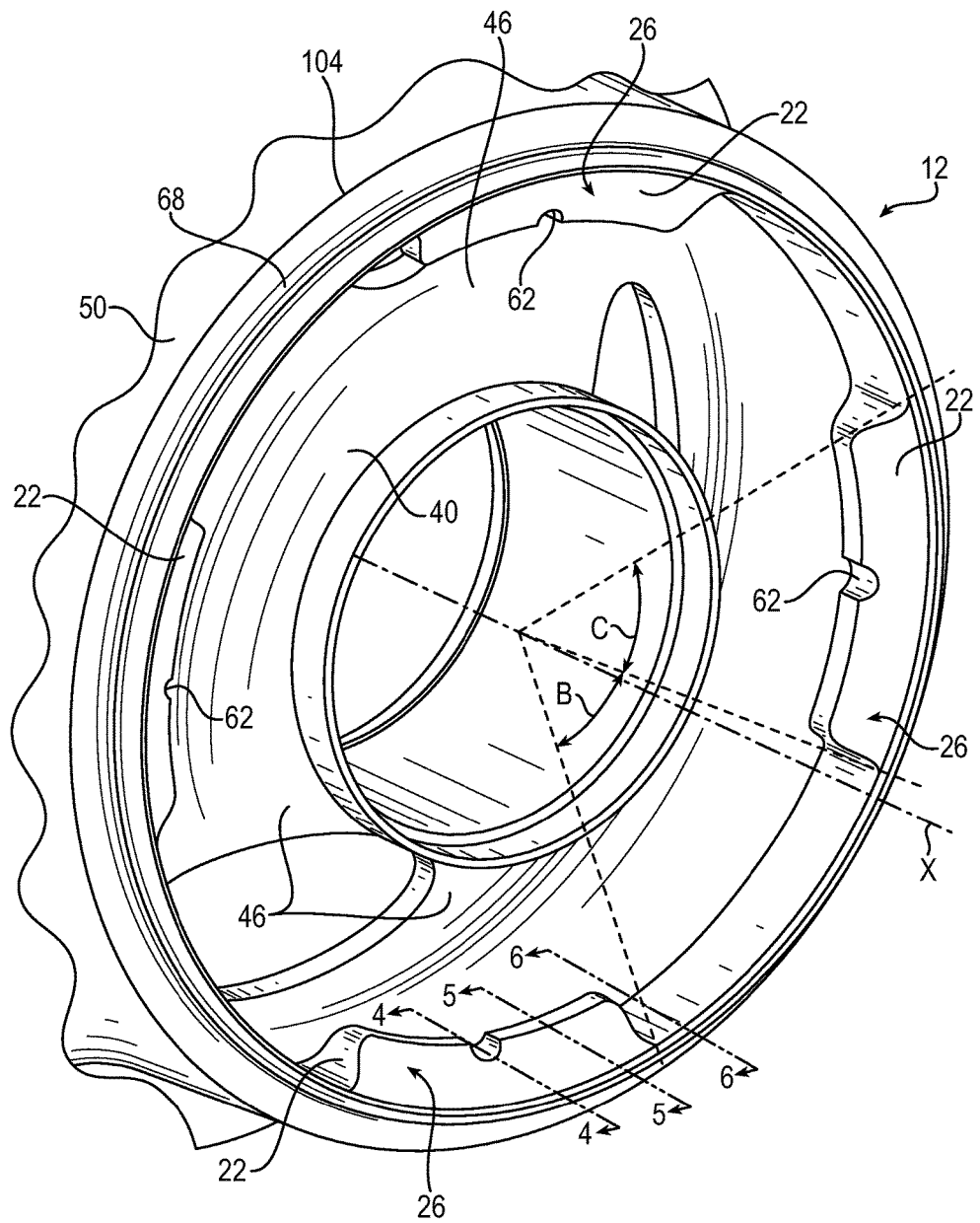
FIG. 3 is a perspective view of an inboard wheel component of the FIG. 1 aircraft wheel assembly.
Figure 4:
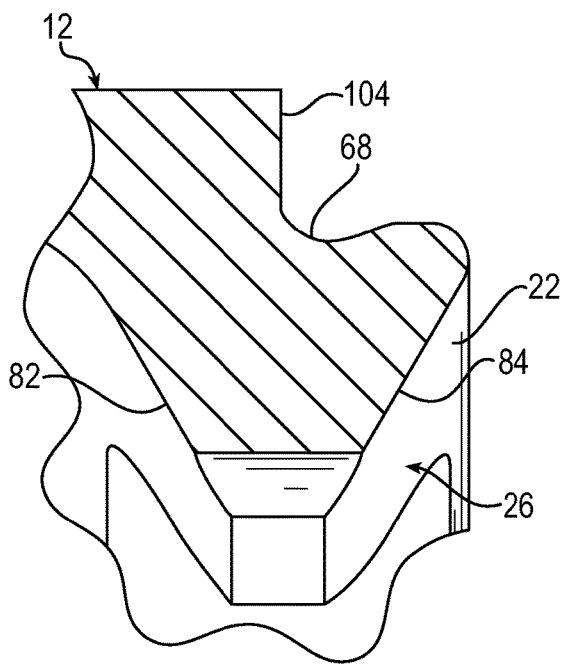
FIG. 4 is an axial sectional view of an interface element portion of the FIG. 3 inboard wheel component as viewed from line 4-4 in FIG. 3.
Figure 5:
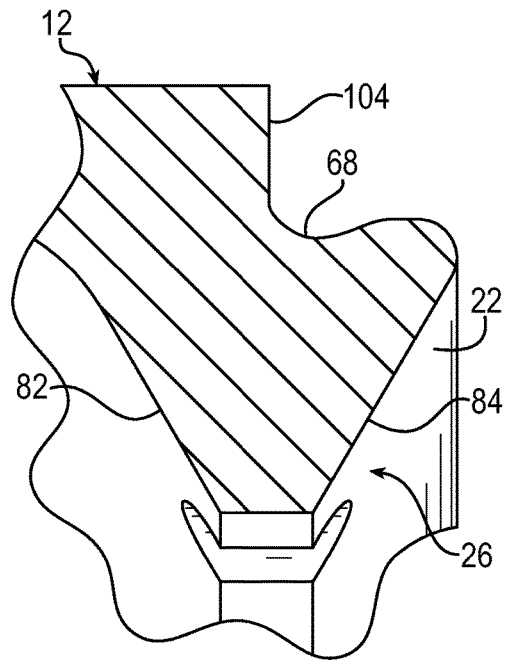
FIG. 5 is an axial sectional view of an interface element portion of the FIG. 3 inboard wheel component as viewed from line 5-5 in FIG. 3.
Figure 7:
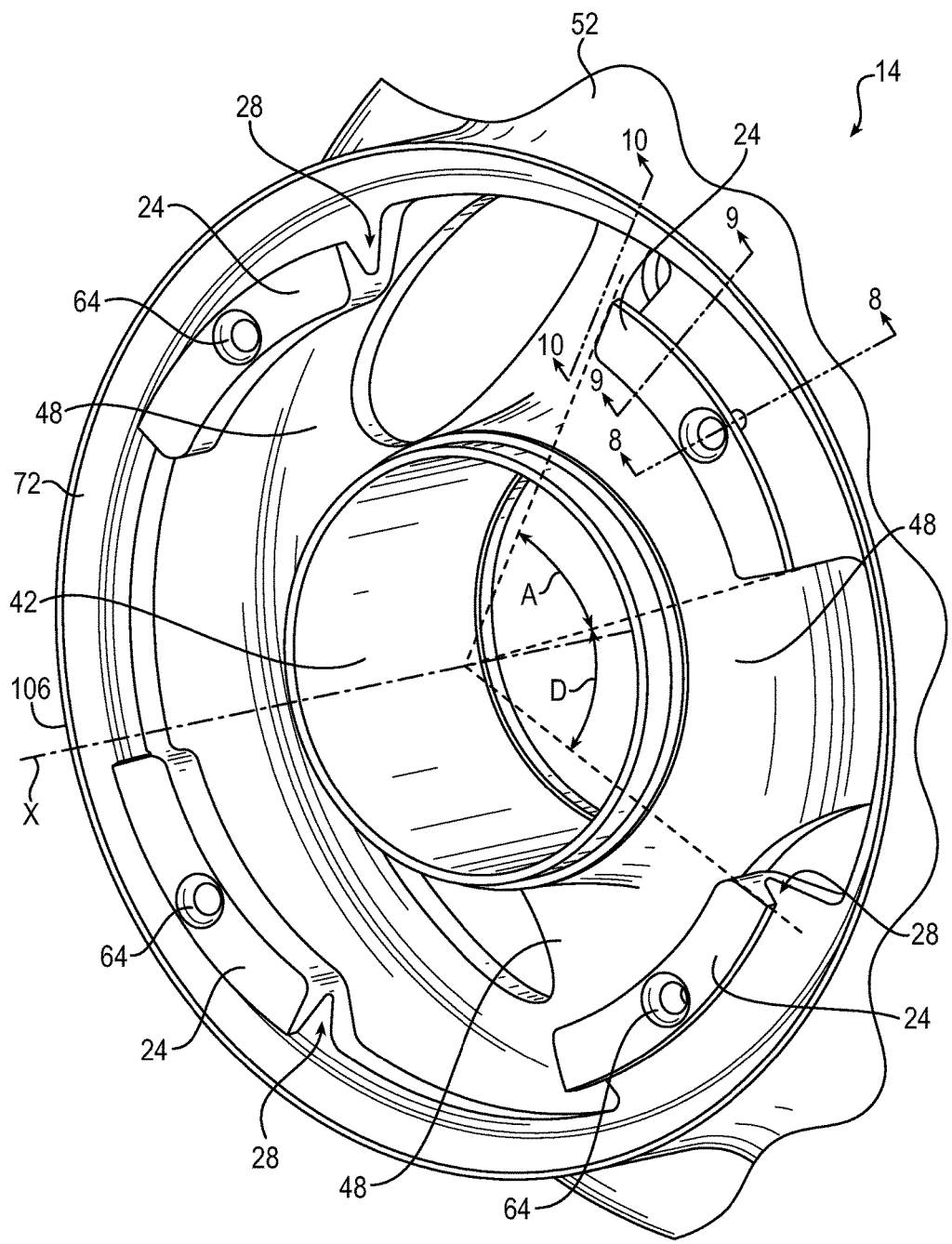
FIG. 7 is a perspective view of an outboard wheel component of the FIG. 1 aircraft wheel assembly.

Referring to FIGS. 1, 3 and 7, each primary wheel component 12, 14 of the wheel assembly 10 has a respective cylindrical hub portion 40, 42, a web portion 46, 48, and an axially extending tube well or cylindrical wheel section 50, 52. The web portion 46, 48 extends radially outwardly from a side of the hub portion 40, 42 and terminates into the cylindrical wheel section 50, 52. In the illustrative embodiment, the web portion 46, 48 has a plurality of circumferentially spaced spokes that interconnect the cylindrical wheel section 50, 52 to the respective hub portion 46, 48. As will be appreciated, the web portion 46, 48 may be a solid radially extending section rather than a spoked member. The hub portions 40, 42 may have annular recesses that receive the respective bearings 32, 34 for supporting the wheel for rotation on the axle.

The inboard and outboard wheel components 12, 14 join together at the interface regions 26, 28. The cylindrical wheel sections 50, 52 extend axially toward the interface regions 26, 28 where they form the respective tongue and groove interface elements 22, 24. The interface elements 22, 24 serve to structurally join the wheel components 12, 14 and may take any number of configurations, sizes and spacings, as is further described herein. As most clearly shown in FIGS. 3 and 7, the interface elements 22, 24 may have respective clocking retention openings 62, 64 that receive the locking screw pins 30 (FIGS. 1 and 2), which, once installed, prevent the primary wheel components 12, 14 from rotating relative to one another.

As shown in FIG. 2, the cylindrical wheel section 50 of the inboard wheel component 12 has a circumferentially extending groove 68 radially outward of the interface element 22 to accommodate a suitable sealing component 70 (FIG. 1) such as an o-ring. The cylindrical wheel section 52 of the outboard wheel component 14 has a circumferentially extending taper 72 that captures the sealing component 70 when the wheel components 12, 14 are joined together. As will be appreciated, the sealing features of the wheel assembly 10 are not limited to the arrangement shown in FIGS. 1 and 2. For example, the wheel seal groove 68 may be provided radially inward of and/or axially offset from the interface elements 22, 24. For tube type wheel assemblies, the wheel seal groove 68 may be simplified to interface as required or as a flat or as a continued edge of the circumferential tongue and groove interface.

The cylindrical wheel sections 50, 52 taper axially away from the midsection and outwardly towards an edge portion that forms respective annular rim flanges 78, 80, shown in the left and right sides of FIG. 1. The hub portions 40, 42 extend axially toward the interface regions 26, 28, where a male interface of the hub portion 42 of the outboard wheel component 14 seats in rotatably sliding relationship with a female interface of the hub portion 40 of the inboard wheel component 12. In another form, the male features may be located on the inboard wheel component 12 rather than the outboard wheel component 14, or on the tubewell for a three part divided wheel assembly.

The interface elements 22, 24 may be formed as an integral or monolithic structure of the respective primary wheel components 12, 14, as shown in the figures. Any suitable manufacturing technique may be used to yield the unitary, one-piece construction of the wheel components 12, 14 and their respective interface elements 22, 24. For example, the wheel components 12, 14 may be cast or forged to include the interface elements 22, 24, followed by machining to achieve appropriate tolerances. In another form, the interface elements 22, 24 may be obtained by removing circumferential sections from the wheel components 12, 14. Numerous other methods of manufacture may be employed, as will be appreciated. The wheel components 12, 14 may be made from any suitable material including, for example, aluminum, aluminum alloy, magnesium, magnesium alloy, among others.

In assembling the wheel assembly 10, an uninflated pneumatic tire is slid onto the inboard wheel component 12, which is shown in FIG. 3. An o-ring 70 is mounted within the groove 68. The outboard wheel component 14, shown in FIG. 7, may then be positioned to axially align its interface elements 24 with the interface elements 22 of the inboard wheel component 12. Such initial axial alignment may serve as a clocking reference to the assembler. Once axially aligned, a simple series of motions including a reverse twist, an axial movement, and a forward twist may be applied to the outboard wheel component 14 relative to the inboard wheel component 12 to interconnect the tongue and groove features thereof and axially align the clocking retention openings 62, 64 thereof, as is more fully described below. The locking screw pins 30 may then be installed in the clocking retention openings 62, 64, as shown in FIG. 2, to rotationally lock the wheel components 12, 14. The pneumatic tire may then be inflated whereby the respective beads of the tire exert an outward force on the respective rim flanges 58, 60, thereby completing the assembly of the inboard and outboard wheel components 12, 14.

Reference is now made to FIGS. 1-3 and 7, which show the configuration, size, and spacing of the interface elements 22, 24 of the primary wheel components 12, 14 as well as their interconnection. The interface between the inboard and outboard wheel components 12, 14 may be a circumferential tongue and groove arrangement similar to a male and female thread interface but with the helical thread angle set to a shallow angle, for example zero degrees (coplanar). Thus, as shown in FIG. 3, the tongue interface elements 22 of the inboard wheel component 12, which form the male thread, may all lie in the same axial plane. Similarly, as shown in FIG. 7, the groove interface elements 24 of the outboard wheel component 14, which form the female thread, may all lie in the same axial plane. It will be appreciated that the interface elements 22, 24 need not be limited to the coplanar arrangement shown in FIGS. 3 and 7. The interface elements 22, 24 may have any suitable shallow helix angle and may form a single or multi-start thread arrangement. Further, either or both of the wheel components 12, 14 may have multiple threads, that is, axially spaced rows, of interface elements 22, 24. A helix angle of zero is preferable although non-zero shallow angles may also be preferable, for example for a multi-start thread arrangement. A non-zero shallow helix angle has a net unthreading force that tends to urge the inboard and outboard wheel components 12, 14 to migrate away from each other, and thus the clocking lock features, for example the locking screw pins 30, are configured to counteract such unthreading force. It will be appreciated that as the helix angle increases the unthreading component of force increases and, consequently, more robust clocking lock features may be provided to counter such increased loads. Of course, as the helix angle is increased to the point where there is zero axial retention at a helix angle of 90 degrees, the unthreading force is purely axial movement; the interface elements 22, 24, that is threads, are simply axial grooves.

The inboard and outboard wheel components 12, 14 have, respectively, four equally circumferentially spaced tongue interface elements 22 and four equally circumferentially spaced groove interface elements 24. As shown in FIGS. 3 and 7, the angular span A of the groove interface elements 24 may be less than the angular span B of the spacing between circumferentially adjacent tongue interface elements 22. Likewise, the angular span C of the tongue interface elements 22 may be less than the angular span D of the spacing between circumferentially adjacent groove interface elements 24. In the non-limiting example of the FIGS. 3 and 7 primary wheel components 12, 14, the angular spans A and C of the interface elements 22, 24 may be 44 degrees while the angular spans B and D of the spacings may be 46 degrees. This sizing and spacing enables the groove interface elements 24 and the tongue interface elements 22 to be axially moved or slid relative to one another when for example the interface elements 24 are axially aligned with the angular spacings B and the angular spacings D are axially aligned with the interface elements 22.

The quantity of interface elements 22, 24 and the circumferential sizing and spacing of the interface elements 22, 24 about the axis X are not limited to that which is depicted in the embodiment shown in FIGS. 1, 3 and 7. The number of interface elements 22, 24 may be two, three, four as shown, five or more. Further, the interface elements 22, 24 need not be equally circumferentially disposed about the axis X. For example, over one portion of the circumference of the wheel assembly 10 the interface elements 22, 24 may be disposed about the axis X at one angle relative to one another, and over another portion of the circumference of the wheel assembly 10 the interface elements 22, 24 may be disposed about the axis X at another angle relative to one another. In addition, although in the FIG. 1 wheel assembly 10 the interface elements 22 may be the same size and the interface elements 24 may be the same size, it will be appreciated that the interface elements 22 may take on different sizes and the interface elements 24 may be of different sizes. For example, the inboard wheel component 12 may have two interface elements 22 that have a first size and angular span, and another two interface elements 22 that have a second size and angular span that are different from that of the first size and angular span. Similarly, the outboard wheel component 14 may have two interface elements 24 that have a first size and angular span, and another two interface elements 24 that have a second size and angular span that are different from that of the first size and angular span.

The tongue and groove interface elements 22, 24 enable the aforementioned simple reverse twist, axial movement, and forward twist scheme of assembling the primary wheel components 12, 14. As an initial clocking reference, the assembler may axially align the tongue interface elements 22 with the groove interface elements 24. For the FIG. 1 embodiment, this also has the effect of axially aligning the clocking retention openings 62, 64. Of course, the initial clocking reference may be other than by axially aligning the interface elements 22, 24 or axially aligning the clocking retention openings 62, 64, for example by aligning marks in the wheel components 12, 14.

From this initial reference, a reverse twist may be applied. The assembler may rotate the outboard wheel component 14 in a reverse direction, for example counterclockwise, about the axis X until the groove interface elements 24 and spacings D of the outboard wheel component 14 axially align with the respective spacings B and tongue interface elements 22 of the inboard wheel component 12. Here, owing to the angular spans A, C of the interface elements 22, 24 being 44 degrees and the angular spans of the spacings B, D being 46 degrees, the amount of reverse rotation to axially align the groove interface elements 24 and spacings D with the respective spacings B and tongue interface elements 22 may be 45 degrees with a clearance of one degree on opposite angular sides of the tongue interface elements 22.

Figure 6:
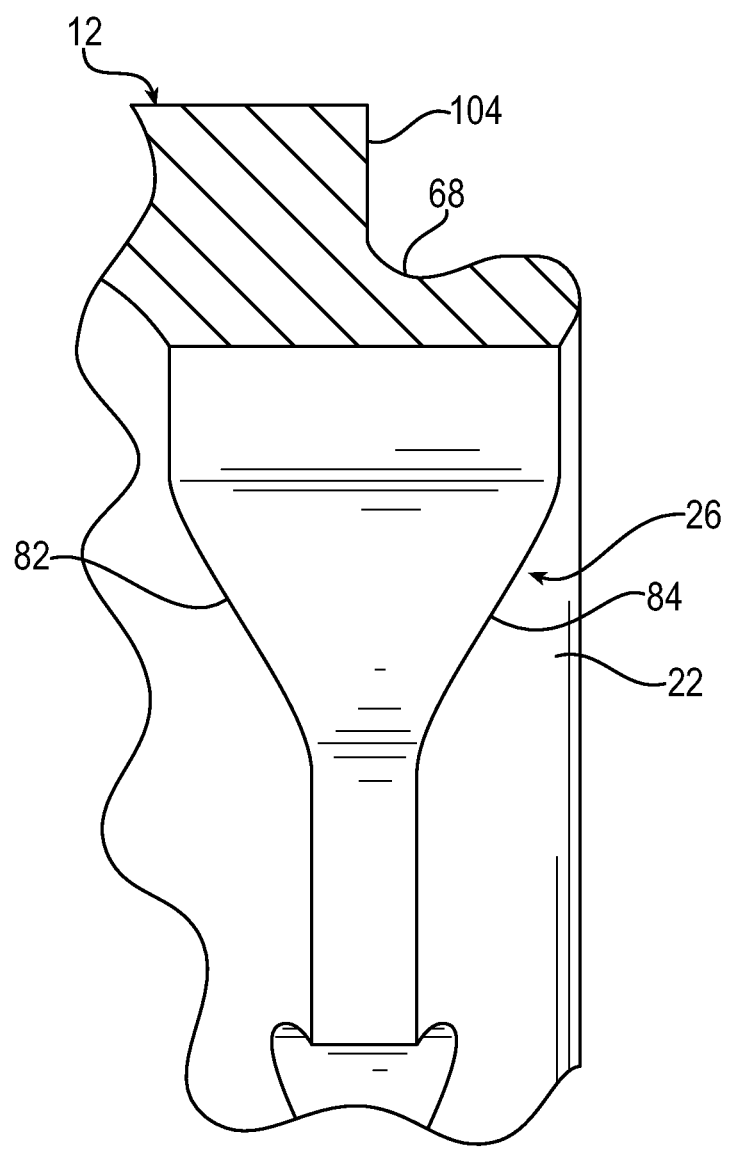
FIG. 6 is an axial sectional view of an interface element portion of the FIG. 3 inboard wheel component as viewed from line 6-6 in FIG. 3.
Figure 10:
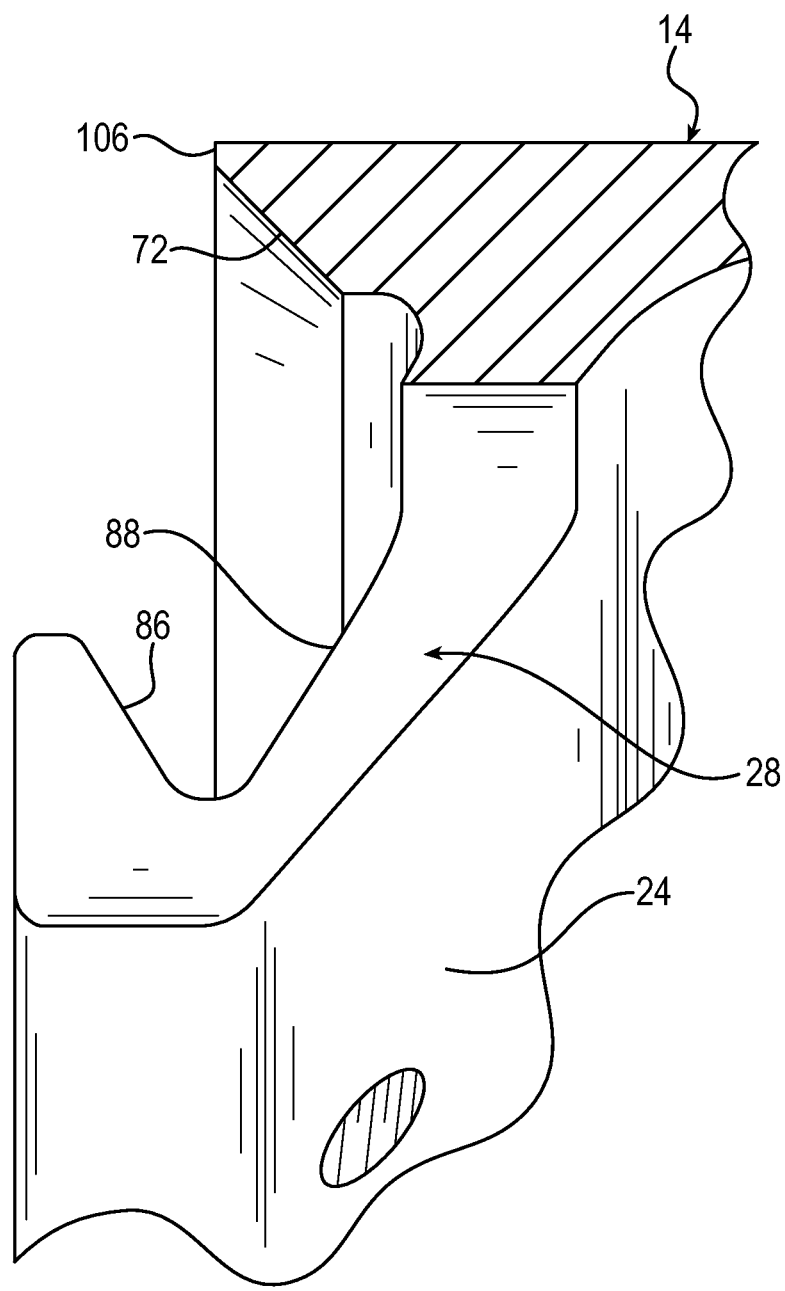
FIG. 10 is an axial sectional view of an interface element portion of the FIG. 7 inboard wheel component as viewed from line 10-10 in FIG. 7.

Once the outboard wheel component 14 has been reverse rotated relative to the inboard wheel component 12, an axial movement may then be applied to align the circumferential ends of the tongue and groove features. The assembler may axially move the outboard wheel component 14 toward the inboard wheel component 12, effectively axially inserting the groove interface elements 24 between the tongue interface elements 22, that is, into the respective spacings B of the inboard wheel component 12. The axial movement may be made until the circumferential ends of the tongue interface elements 22 align with the circumferential ends of the groove interface elements 24, for example in the following manner. As shown in FIGS. 6 and 10, the tongue interface elements 22 may have a rounded V shape in circumferential end view that corresponds to a rounded V shape in circumferential end view of the grooves defined by the groove interface elements 24. The circumferential ends of the tongue interface elements 22 may be aligned with the circumferential ends of the groove interface elements 24 when their respective V shapes align, that is, when inward and outward interfaces 82, 84 of the tongue interface elements 22 align with inward and outward interfaces 86, 88 of the groove interface elements 24.

It will be appreciated that the alignment of the circumferential ends of the tongue interface elements 22 with the circumferential ends of the groove interface elements 24 may be realized or supplemented by other means. For example, in the FIG. 1 wheel assembly 10, the circumferential ends of the tongue interface elements 22 may align with the circumferential ends of the groove interface elements 24 when the outboard wheel component 14 is axially seated relative to the inboard wheel component 12, which may be at the hub portions 40, 42 and/or the cylindrical wheel sections 50, 52 of the wheel components 12, 14. As shown in FIG. 1, an end of the hub portion 42 of the outboard wheel component 14 may slidably fit within an end of the hub portion 40 of the inboard wheel component 12. A distal end of the hub portion 42 may abut an interior circumferential ledge 94 of the hub portion 40, and a distal end of the hub portion 40 may abut an exterior circumferential ledge 96 of the hub portion 42. The ledges 94, 96 may thus serve as axial movement stops to prevent further axial movement of, for example, the outboard wheel component 14 onto the inboard wheel component 12, and further as cirumferential alignment mechanisms to align the circumferential ends of the tongue interface elements 22 with the circumferential ends of the groove interface elements 24. As is also shown in FIG. 1, a distal end 104 of the cylindrical wheel section 50 may abut a distal end 106 of the cylindrical wheel section 52. The distal ends 104, 106 thus may also serve as axial movement stops to prevent further axial movement of, for example, the outboard wheel component 14 onto the inboard wheel component 12, and further as cirumferential alignment mechanisms to align the circumferential ends of the tongue interface elements 22 with the circumferential ends of the groove interface elements 24.

The tongue interface elements 22 and the grooves defined by the groove interface elements 24 are not limited to a rounded V shape in circumferential end view as shown in FIGS. 4-6 and FIGS. 8-10, and other embodiments are contemplated. For example, the circumferential end views may have a semicircular or bulbous shape, a slightly elongated rounded shape, or any other suitable shape in circumferential end view that enables the interface elements 22, 24 to interconnect and axially retain the primary wheel components 12, 14 in fixed relation to one another.

In addition, although as shown in FIGS. 2, 4-6, and 8-10, the tongue interface elements 22 project radially inward from an inside diameter of the inboard wheel component 12 and the groove interface elements 24 likewise project radially inward from an inside diameter of the outboard wheel component 14, the interface elements 22, 24 need not be limited as such. As will be appreciated, the interface elements 22, 24 may project radially outward from an outside diameter of the respective wheel components 12, 14. In another form, the tongue interface elements 22 may project radially inward from an inside diameter of the inboard wheel component 12 and the groove interface elements 24 may project radially outward from an outside diameter of the outboard wheel component 14. In still another form, the tongue interface elements 22 may project radially outward from an outside diameter of the inboard wheel component 12 and the groove interface elements 24 may project radially inward from an inside diameter of the outboard wheel component 14.

Once the outboard wheel component 14 has been axially moved relative to the inboard wheel component 12 so as to align the circumferential ends of the tongue interface elements 22 with the circumferential ends of the groove interface elements 24, a forward twist may then be applied. The assembler may rotate the outboard wheel component 14 in a forward direction, for example clockwise, about the axis X until the interface elements 24 interconnect with the interface elements 22 over their respective angular spans A and C and the clocking retention openings 62 axially align with the clocking retention openings 64. Once clocked in this position, the assembler may then install the locking screw pins 30 in the clocking retention openings 62, 64 to rotationally lock the outboard wheel component 14 relative to the inboard wheel component 12.

Referring to FIGS. 1 and 2, the primary wheel components 12, 14 react structural tire loads and pressure through the engagement of the groove interface elements 24 with the tongue interface elements 22. As shown in FIG. 2, the tongue and groove arrangement may prevent relative axial movement between the wheel components 12, 14, for example, by the inward interfaces 86 of the groove interface elements 24 abutting the inward interfaces 82 of the tongue interface elements 22.

As will be appreciated, the FIG. 1 aircraft wheel assembly 10 may have many potential assembly schemes that may comprise combinations of forward (for example clockwise) or reverse (for example counterclockwise) movements and axial advances, the above described reverse twist, axial movement, forward twist scheme being only one example. Assembly of the aircraft wheel assembly 10 is not limited to a reverse twist, axial movement, forward twist scheme as above described, and other embodiments are contemplated.

For example, in an embodiment, the assembler may rotate the outboard wheel component 14 forward, that is clockwise, relative to the inboard wheel component 12 to axially align the respective groove interface elements 24 and tongue interface elements 22, followed by axially moving the outboard wheel component 14 relative to the inboard wheel component 12 to circumferentially align the groove interface elements 24 with the tongue interface elements 22, followed by rotating the outboard wheel component 14 in the reverse direction, that is counterclockwise, relative to the inboard wheel component 12 to interconnect the interface elements 22, 24 and align the clocking retention openings 62 with the clocking retention openings 64. The assembler may then install the locking screw pins 30 in the clocking retention openings 62, 64 to rotationally lock the outboard wheel component 14 relative to the inboard wheel component 12.

Other assembly schemes are also contemplated. For example, the assembly scheme may be one of reverse twist, axial movement, and further reverse twist; or forward twist, axial movement, and further forward twist. In addition, it will be appreciated that the first rotation may be eliminated. For example, the assembler may axially align the outboard wheel component 14 with the inboard wheel component 12 in a position where the axial movement step can be performed. For example, the assembler may initially align the groove interface elements 24 with the spaces B between circumferentially adjacent groove interface elements 22 and then proceed with axially moving the outboard wheel component 14 toward the inboard wheel component 12. With this initial alignment, the assembly scheme becomes one of axial movement and reverse twist (or axial movement and forward twist) of the outboard wheel component 14 relative to the inboard wheel component 12.

In the FIG. 1 wheel assembly 10 the helical thread angle of the circumferential tongue and groove arrangement is set to zero degrees and the assembly of the outboard wheel assembly 14 relative to the inboard wheel assembly 12 may follow, for example, a reverse twist, axial movement, forward twist scheme or a forward twist, axial movement, reverse twist scheme. The wheel assembly 10 is not limited as such and other embodiments are contemplated. For example, the circumferential tongue and groove arrangement may have a helical thread angle that is greater than zero degrees and be arranged as a right handed thread, and the assembly of the outboard wheel assembly 14 relative to the inboard wheel assembly 12 may follow a reverse twist, axial movement, forward twist scheme. Similarly, the circumferential tongue and groove arrangement may have a helical thread angle that is greater than zero degrees and be arranged as a left handed thread, and the assembly of the outboard wheel assembly 14 relative to the inboard wheel assembly 12 may follow a forward twist, axial movement, reverse twist scheme.

FIGS. 1, 3 and 7 show the inboard wheel component 12 having tongue interface elements 22 and the outboard wheel component 14 having groove interface elements 24. It will be appreciated that the tongue and groove arrangement is not limited as such and other embodiments are contemplated. For example, in one form the inboard wheel component 12 may have groove interface elements 24 and the outboard wheel component 14 may have tongue interface elements 22. In another form, the inboard wheel component 12 may have both tongue interface elements 22 and groove interface elements 24, for example in alternating relation around the circumference, that correspond to respective groove interface elements 24 and tongue interface elements 22 of the outboard wheel component 14.

FIGS. 11-17 show an aircraft wheel assembly 210 according to another embodiment of the invention. The FIG. 11 wheel assembly 210 is in many respects substantially the same as the above-referenced FIG. 1 wheel assembly 10, and consequently the same reference numerals but indexed by 200 are used to denote structures corresponding to similar structures in the FIG. 1 wheel assembly 10. In addition, the foregoing description of the FIG. 1 wheel assembly 10 is equally applicable to the FIG. 11 wheel assembly 210 except as noted below. Moreover, it will be appreciated upon reading and understanding the specification that aspects of the wheel assemblies 10, 210 may be substituted for one another or used in conjunction with one another where applicable.

Figure 11:
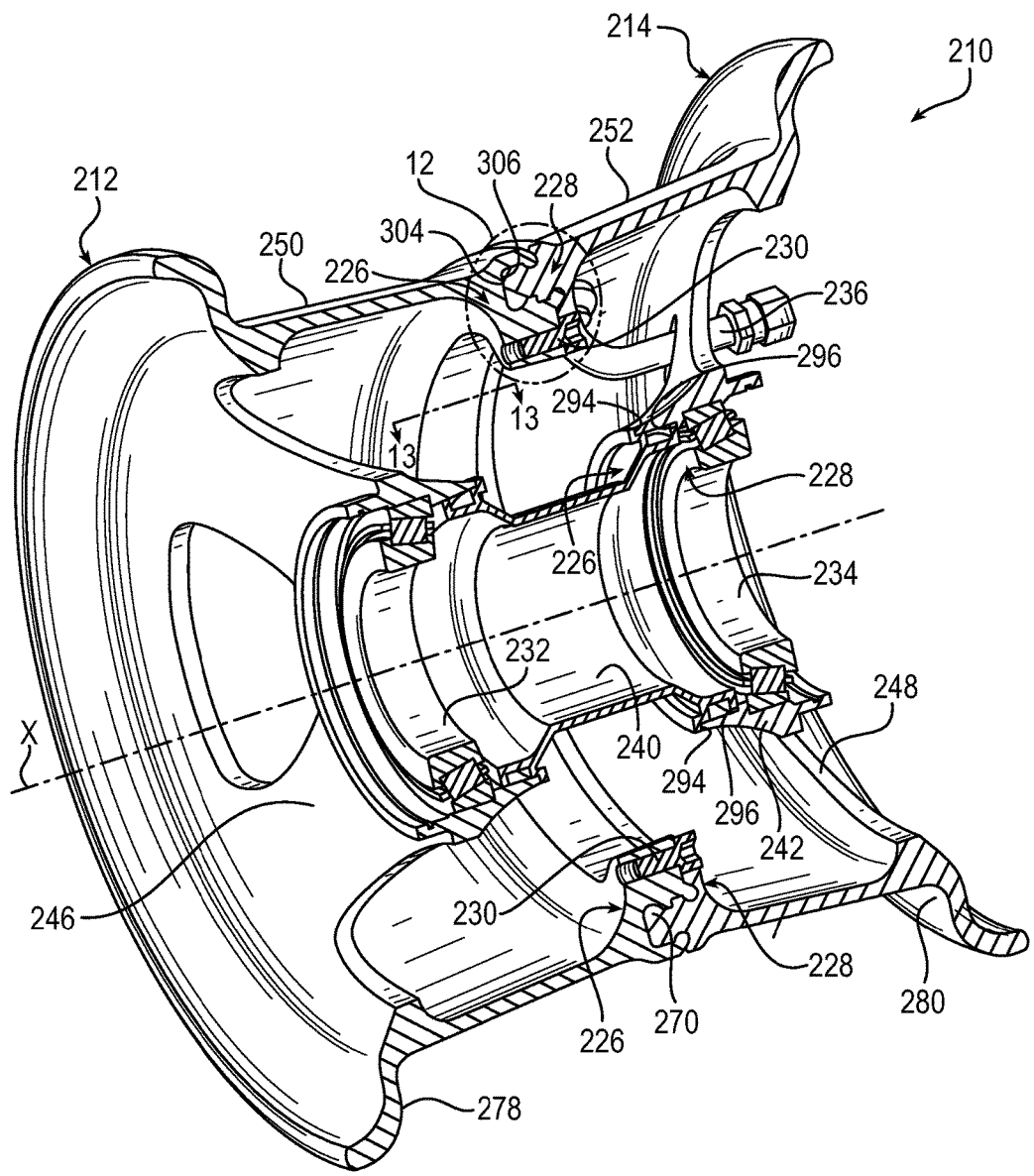
FIG. 11 is a perspective view of another exemplary aircraft wheel assembly according to the invention, with an angular portion removed to show cross section detail of the inboard and outboard wheel components.
Figure 12:
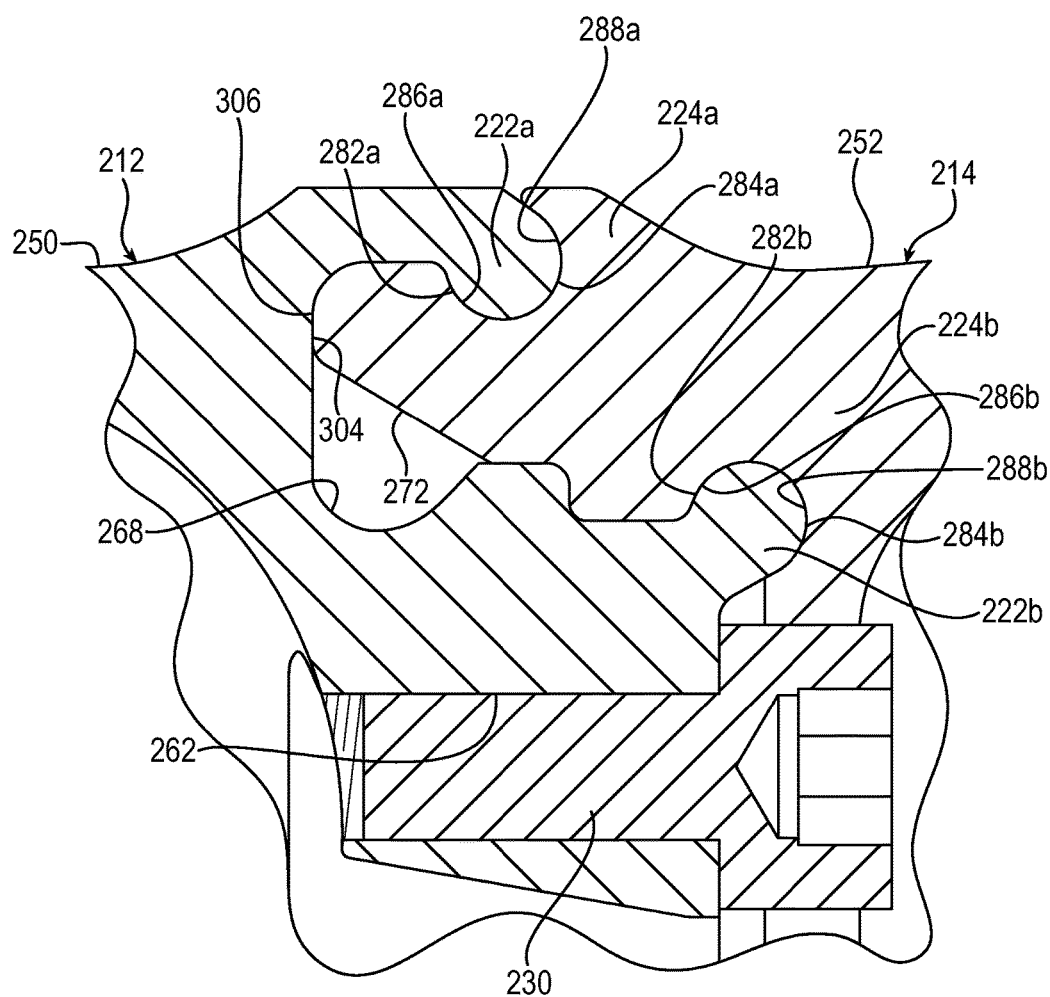
FIG. 12 is an axial sectional view of a portion of the aircraft wheel assembly of FIG. 11, as viewed from the dashed circle line labeled 12 in FIG. 11, showing the interface between components in greater detail.
Figure 13:
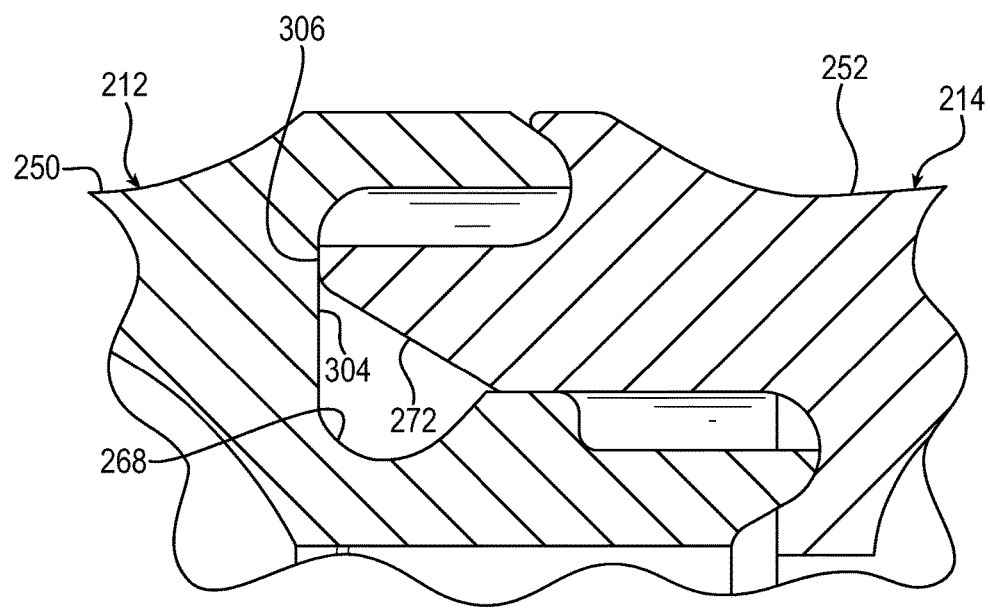
FIG. 13 is an axial sectional view of a portion of the aircraft wheel assembly of FIG. 11, as viewed from line 13-13 in FIG. 11, showing the interface between components in greater detail.
Figure 14:
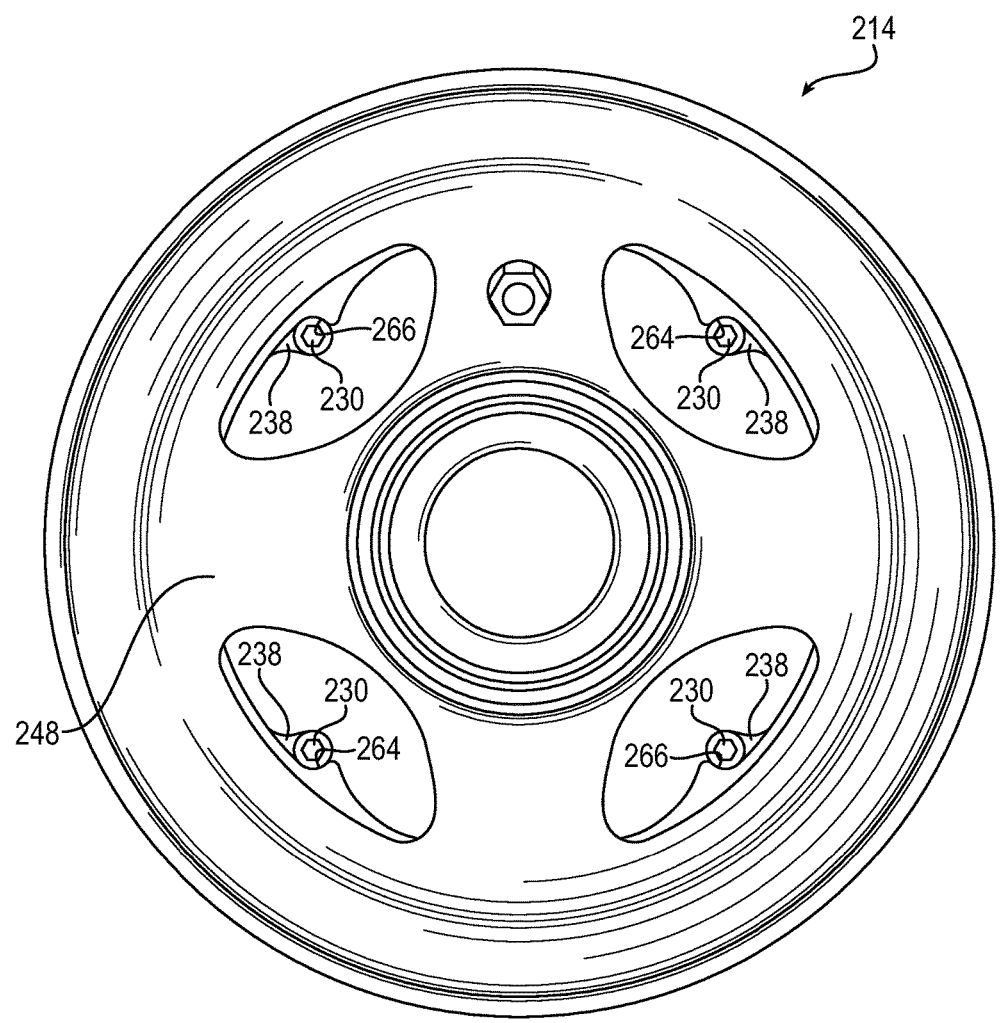
FIG. 14 is an axial end view of the aircraft wheel assembly of FIG. 11, showing clocking retention features.
Figure 15:
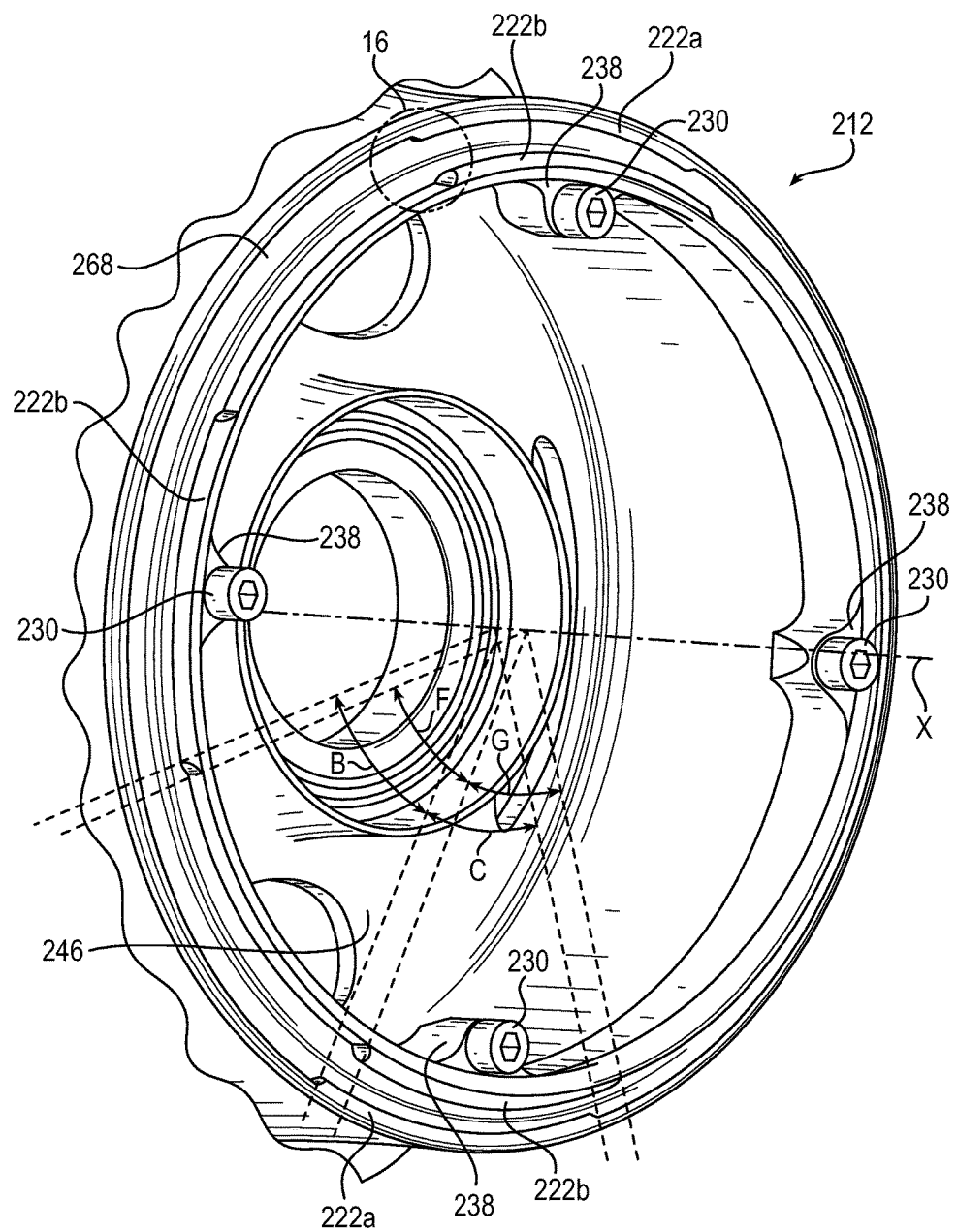
FIG. 15 is a perspective view of an inboard wheel component of the FIG. 11 aircraft wheel assembly.
Figure 16:
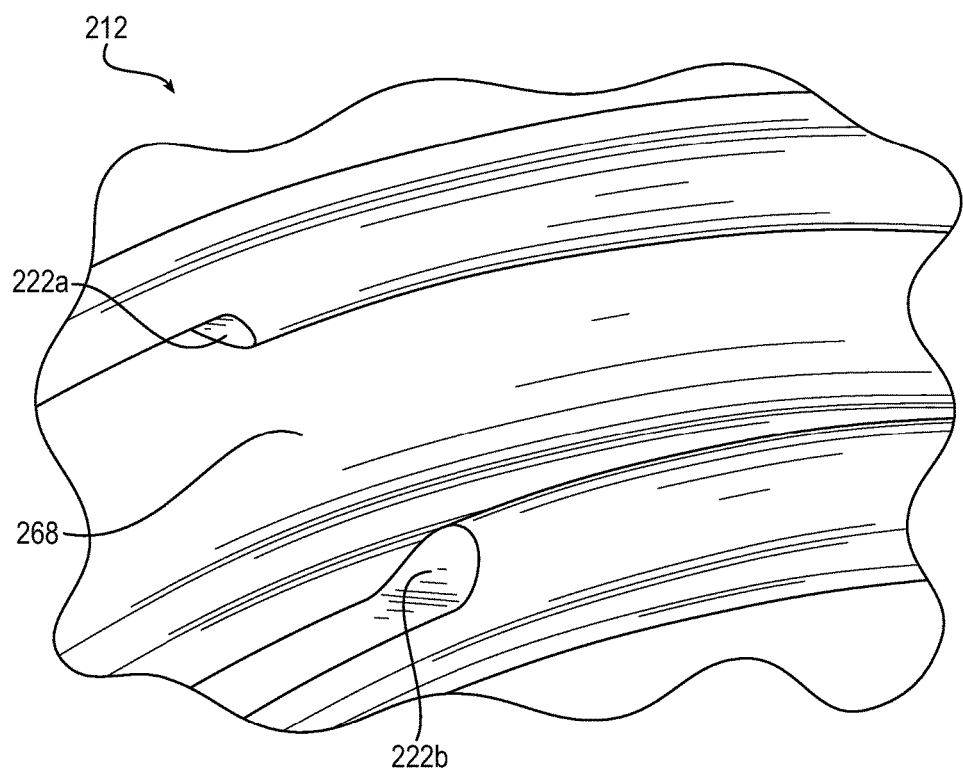
FIG. 16 is an exploded perspective view of an interface element portion of the inboard wheel component of the FIG. 11 aircraft wheel assembly.
Figure 17:
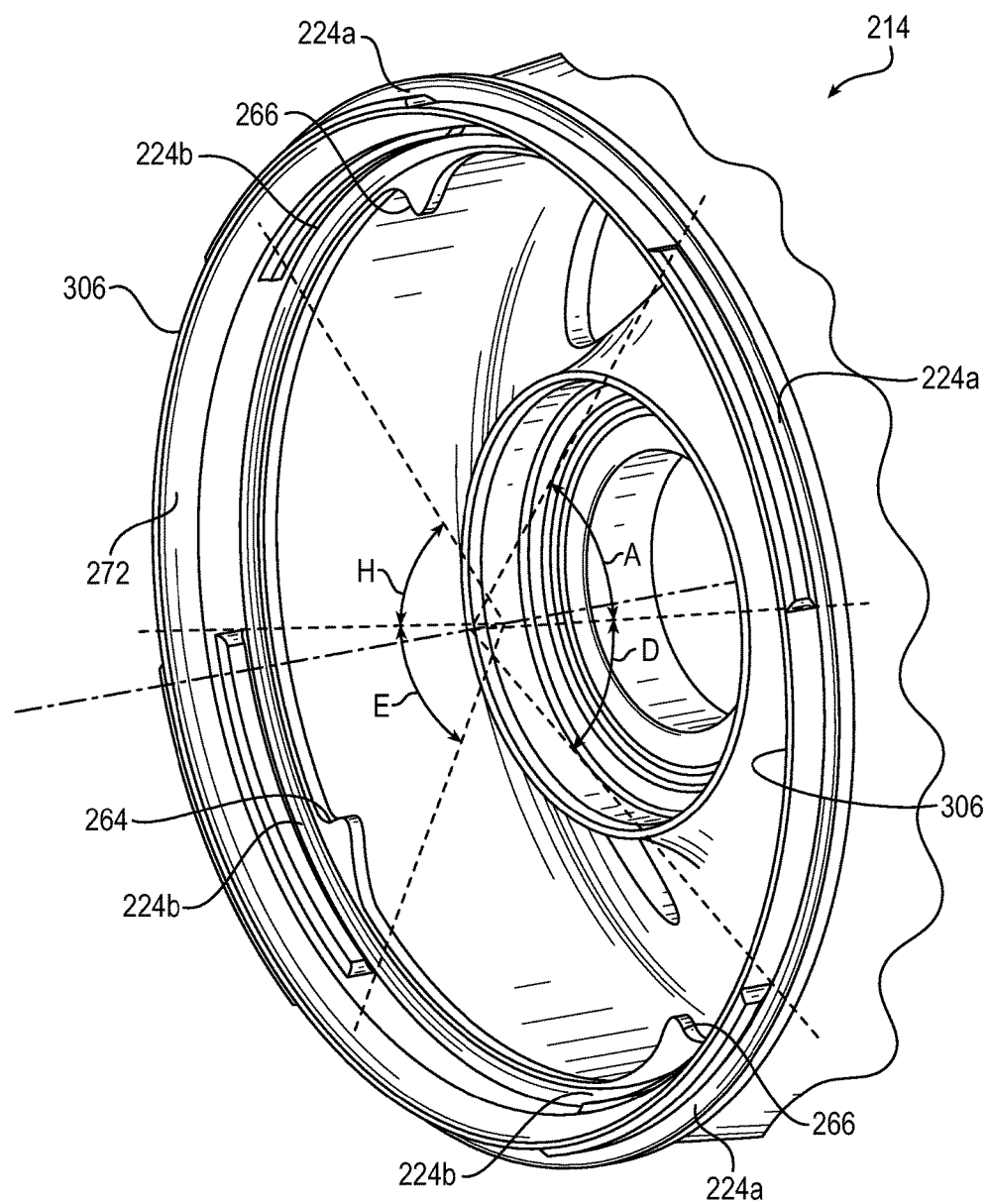
FIG. 17 is a perspective view of an outboard wheel component of the FIG. 11 aircraft wheel assembly.

The FIG. 11 wheel assembly 210 includes an inboard primary wheel component 212, best shown in FIGS. 15 and 16, and a separable outboard primary wheel component 214, best shown in FIGS. 14 and 17, which together support a tire (not shown) thereon. The inboard wheel component 212 has first and second rows, or threads, of a plurality of tongue interface elements 222a and 222b disposed circumferentially about an axis X of the wheel assembly 210 and shown in axial cross section in FIG. 12. The outboard wheel component 214 has first and second rows, or threads, of a plurality of groove interface elements 224a and 224b disposed circumferentially about the axis X, and likewise shown in axial cross section in FIG. 12. As shown in FIGS. 11-13, and as will be described in greater detail below, the tongue interface elements 222a, 222b and the respective groove interface elements 224a, 224b form a tongue and groove arrangement that interconnects the primary wheel components 212, 214 at respective interface regions 226, 228. With this interconnection, the interface elements 222a, 222b, 224a, 224b serve to structurally retain the wheel components 212, 214 in fixed relation to one another.

The clocking retention features of the FIG. 11 wheel assembly 210 include locking screw pins 230 and a plurality of stops 264, 266. As shown in FIGS. 11, 12, 14 and 15 the locking screw pins 230 are installed in openings 262 in four equally circumferentially spaced boss portions 238 that project radially inward from the tongue interface elements 222a, 222b of the inboard wheel component 212. As shown in FIGS. 14 and 17, the outboard wheel component 214 includes four equally circumferentially spaced stops, two of which are clockwise stops 264 and two of which are counterclockwise stops 266. The clockwise stops 264 abut the locking screw pins 230 to prevent clockwise rotational movement of the outboard wheel component 214 relative to the inboard wheel component 212, and the counterclockwise stops 266 abut the locking screw pins 230 to prevent counterclockwise rotational movement of the outboard wheel component 214 relative to the inboard wheel component 212. As can be seen in FIGS. 15 and 17, the clocking retention features may be circumferentially in the middle of the interconnected tongue interface elements 222a, 222b and groove interface elements 224a, 224b.

As shown in FIG. 12, the cylindrical wheel section 250 of the inboard wheel component 212 has a circumferentially extending groove 268 radially inward of the interface elements 222a, 222b to accommodate a suitable sealing component 270 (FIG. 11) such as an o-ring. The cylindrical wheel section 252 of the outboard wheel component 214 has a circumferentially extending taper 272 that captures the sealing component 270 when the wheel components 212, 214 are joined together.

In assembling the wheel assembly 210, an uninflated pneumatic tire is slid onto the inboard wheel component 210, which is shown in FIG. 15. An o-ring 270 is mounted within the groove 268. The outboard wheel component 214, shown in FIG. 17, may then be positioned to axially align its interface elements 224a, 224b with the interface elements 222a, 222b of the inboard wheel component 212. Such initial axial alignment may serve as a clocking reference to the assembler. Once axially aligned, a simple series of motions including a reverse twist, an axial movement, and a forward twist may be applied to the outboard wheel component 214 relative to the inboard wheel component 214 to interconnect the tongue and groove features thereof and axially align the clocking retention openings 262 with the clocking retention stops 264, 266, as is more fully described below. The locking screw pins 230 may then be installed in the clocking retention openings 262, as shown in FIG. 12, to rotationally lock the wheel components 212, 214. The pneumatic tire may then be inflated whereby the respective beads of the tire exert an outward force on the respective rim flanges 258, 260, thereby completing the assembly of the inboard and outboard wheel components 212, 214.

FIGS. 11, 12, 15 and 17 show the configuration, size, and spacing of the tongue and groove interface elements 222a, 222b, 224a, 224b of the primary wheel components 212, 214 as well as their interconnection. In this embodiment, the wheel components 212, 214 have multiple threads, that is, axially spaced or staggered rows, of interface elements 222a, 222b, 224a, 224b at a zero helix angle. In the various figures, the suffix a represents a first row of interface elements 222a, 224a and the suffix b represents a second row of interface elements 222b, 224b. As shown in FIGS. 12 and 15, the first row of the tongue interface elements 222a of the inboard wheel component 212 lie in a first axial plane, and the second row of the tongue interface elements 222b of the inboard wheel component 212 lie in a second axial plane that is axially spaced from the first axial plane. As shown in FIGS. 12 and 17, the first row of the groove interface elements 224a of the outboard wheel component 214 may lie in the first axial plane, and the second row of the groove interface elements 224b of the outboard wheel component 214 may lie in the second axial plane.

The tongue interface elements 222a and 222b of the inboard wheel component 212 may number in four and be equally circumferentially spaced about the axis X, and the groove interface elements 224a and 224b of the outboard wheel component 214 may likewise number in four and be equally circumferentially spaced about the axis X. As can be seen from FIGS. 14, 15 and 17, this may yield an equal circumferential distribution of the tongue and groove interconnections of the interface elements 222a and 224a and the tongue and groove interconnections of the interface elements 222b and 224b. In addition, as shown in FIGS. 11, 12, 14, 15 and 17, in an assembled state of the wheel assembly 210 the twist and lock interconnections may be configured such that the interconnected tongue and groove interface elements 222a and 224a have the same circumferential distribution as, and align axially with, the interconnected tongue and groove interface elements 222b and 224b. As shown in FIGS. 15 and 17, the angular span A of the groove interface elements 224a may be less than the angular span B of the spacing between circumferentially adjacent tongue interface elements 222a, and the angular span C of the tongue interface elements 222a may be less than the angular span D of the spacing between circumferentially adjacent groove interface elements 224a. Likewise, the angular span E of the groove interface elements 224b may be less than the angular span F of the spacing between circumferentially adjacent tongue interface elements 222b, and the angular span G of the tongue interface elements 222b may be less than the angular span H of the spacing between circumferentially adjacent groove interface elements 224b. In the non-limiting example of the FIGS. 15 and 17 primary wheel components 212, 214, the angular spans A, C, E and G of the respective interface elements 224a, 222a, 224b and 222b may be 44 degrees while the angular spans B, D, F and H of the spacings may be 46 degrees. This sizing and spacing enables the groove interface elements 224a, 224b and the tongue interface elements 222a, 222b to be axially moved or slid relative to one another when for example the groove interface elements 224a are axially aligned with the angular spacings B and the angular spacings D are axially aligned with the tongue interface elements 222a, and the groove interface elements 224b are axially aligned with the angular spacings F and the angular spacings H are axially aligned with the tongue interface elements 222b.

The tongue and groove interface elements 222a, 222b, 224a, 224b enable the aforementioned simple reverse twist, axial movement, and forward twist scheme of assembling the primary wheel components 212, 214. As an initial clocking reference, the assembler may axially align the tongue interface elements 222a with the groove interface elements 224a. For the FIG. 11 embodiment, this also has the effect of axially aligning the clocking retention boss portions 238 and the clocking retention openings 262 of the inboard wheel component 212 with the clocking retention stops 264, 266 of the outboard wheel component 214. Additionally, this has the effect of axially aligning the second row of tongue interface elements 222b with the second row of groove interface elements 224b.

From this initial reference, a reverse twist may be applied. The assembler may rotate the outboard wheel component 214 in a reverse direction, for example counterclockwise, about the axis X until the groove interface elements 224a and spacings D of the outboard wheel component 214 axially align with the respective spacings B and tongue interface elements 222a of the inboard wheel component 212. Here, owing to the angular spans A, C of the interface elements 224a, 222a being 44 degrees and the angular spans of the spacings B, D being 46 degrees, the amount of reverse rotation to axially align the groove interface elements 224a and spacings D with the respective spacings B and tongue interface elements 222a may be 45 degrees with a clearance of one degree on opposite angular sides of the tongue interface elements 222a. With respect to the second row, owing to the angular spans E, G of the interface elements 224b, 222b being 44 degrees and the angular spans of the spacings F, H being 46 degrees, the amount of reverse rotation to axially align the groove interface elements 224b and spacings H with the respective spacings F and tongue interface elements 222b may be 45 degrees with a clearance of one degree on opposite angular sides of the tongue interface elements 222b.

Once the outboard wheel component 214 has been reverse rotated relative to the inboard wheel component 212, an axial movement may then be applied to align the circumferential ends of the tongue and groove features. The assembler may axially move the outboard wheel component 214 toward the inboard wheel component 212, effectively axially inserting the first and second rows of groove interface elements 224a and 224b between the respective first and second rows of tongue interface elements 222a and 222b, that is, into the respective spacings B and F of the inboard wheel component 212. The axial movement may be made until the circumferential ends of the tongue interface elements 222a and 222b align with the respective circumferential ends of the groove interface elements 224a and 224b, for example in the following manner. As shown in FIGS. 12 and 13, the tongue interface elements 222a and 222b may have a semicircular or bulbous shape in circumferential end view that corresponds to a semicircular or bulbous shape in circumferential end view of the grooves defined by the groove interface elements 224a and 224b. The circumferential ends of the tongue interface elements 222a, 222b may be aligned with the circumferential ends of the groove interface elements 224a, 224b when their respective semicircular or bulbous shapes align, that is, when inward and outward interfaces 282a, 284a of the tongue interface elements 222a align with inward and outward interfaces 286a, 288a of the groove interface elements 224a, and inward and outward interfaces 282b, 284b of the tongue interface elements 222b align with inward and outward interfaces 286b, 288b of the groove interface elements 224b.

It will be appreciated that the alignment of the circumferential ends of the tongue interface elements 222a, 222b with the circumferential ends of the groove interface elements 224a, 224b may be realized or supplemented by other means. For example, in the FIG. 11 wheel assembly 210, the circumferential ends of the tongue interface elements 222a, 222b may align with the circumferential ends of the groove interface elements 224a, 224b when the outboard wheel component 214 is axially seated relative to the inboard wheel component 212, which may be at the hub portions 240, 242 and/or the cylindrical wheel sections 250, 252 of the wheel components 212, 214. As shown in FIGS. 11-13, an end of the hub portion 242 of the outboard wheel component 214 may slidably fit within an end of the hub portion 240 of the inboard wheel component 212. A distal end of the hub portion 242 may abut a circumferential ledge 294 of the hub portion 240, and a distal end of the hub portion 240 may abut a circumferential ledge 296 of the hub portion 242. The ledges 294, 296 may thus serve as axial movement stops to prevent further axial movement of, for example, the outboard wheel component 214 onto the inboard wheel component 212, and further as cirumferential alignment mechanisms to align the circumferential ends of the tongue interface elements 222a, 222b with the circumferential ends of the groove interface elements 224a, 224b. As is also shown in FIGS. 11-13, a distal end 304 of the cylindrical wheel section 250 may abut a distal end 306 of the cylindrical wheel section 252. The distal ends 304, 306 thus may also serve as axial movement stops to prevent further axial movement of, for example, the outboard wheel component 214 onto the inboard wheel component 212, and further as cirumferential alignment mechanisms to align the circumferential ends of the tongue interface elements 222a, 222b with the circumferential ends of the groove interface elements 224a, 224b.

Once the outboard wheel component 214 has been axially moved relative to the inboard wheel component 212 so as to align the circumferential ends of the tongue interface elements 222a, 222b with the circumferential ends of the groove interface elements 224a, 224b, a forward twist may then be applied. The assembler may rotate the outboard wheel component 214 in a forward direction, for example clockwise, about the axis X until the interface elements 224a, 224b interconnect with the interface elements 222a, 222b over their respective angular spans A, E and C, G, and the clocking retention boss portions 238 and openings 262 of the inboard wheel component 212 align with the clocking retention stops 264, 266 of the outboard wheel component 214. Once clocked in this position, the assembler may then install the locking screw pins 230 in the clocking retention openings 262 to rotationally lock the outboard wheel component 214 relative to the inboard wheel component 212.

Referring to FIGS. 11 and 12, the primary wheel components 212, 214 react structural tire loads and pressure through the engagement of the groove interface elements 224a, 224b with the tongue interface elements 222a, 222b. As shown in FIG. 12, the tongue and groove arrangement may prevent relative axial movement between the wheel components 212, 214, for example, by the inward interfaces 286a, 286b of the groove interface elements 224a, 224b abutting the inward interfaces 282a, 282b of the tongue interface elements 222a, 222b.

As will be appreciated, as with the FIG. 1 aircraft wheel assembly 10, the FIG. 11 aircraft wheel assembly 210 may have many potential assembly schemes that may comprise combinations of forward (for example clockwise) or reverse (for example counterclockwise) movements and axial advances, the above described reverse twist, axial movement, forward twist scheme being only one example. The aircraft wheel assembly 210 is not limited to a reverse twist, axial movement, forward twist scheme as above described, and other embodiments are contemplated.

For example, in an embodiment the assembler may install two locking screw pins 230 in two 180 degrees opposed clocking retention openings 262, followed by axially aligning the clockwise clocking retention stops 264 with the installed locking screw pins 230, followed by a reverse rotation of the outboard wheel component 214 relative to the inboard wheel component 212, followed by an axial movement of the outboard wheel component 214 toward the inboard wheel component 212 so as to align the circumferential ends of the groove interface elements 224a, 224b with the circumferential ends of the tongue interface elements 222a, 222b, followed by a forward rotation of the outboard wheel component 214 relative to the inboard wheel component 212 until the clockwise clocking retention stops 264 abut the installed locking screw pins 230, the forward rotation serving to interconnect the groove interface elements 224a, 224b with the tongue interface elements 222a, 222b. The assembler may then install the other two locking screw pins 230 in the two 180 degrees opposed clocking retention openings 262 aligned with the counterclockwise clocking retention stops 266, thereby locking the outboard wheel component 214 relative to the inboard wheel component 212.

FIGS. 18-24 show an aircraft wheel assembly 410 according to another embodiment of the invention. The FIG. 18 wheel assembly 410 is in many respects substantially the same as the above-referenced FIGS. 1 and 11 wheel assemblies 10, 210 and consequently the same reference numerals but indexed by 400 are used to denote structures corresponding to similar structures in the FIGS. 1 and 11 wheel assemblies 10, 210. In addition, the foregoing description of the FIGS. 1 and 11 wheel assemblies 10, 210 is equally applicable to the FIG. 18 wheel assembly 410 except as noted below. Moreover, it will be appreciated upon reading and understanding the specification that aspects of the wheel assemblies 10, 210, 410 may be substituted for one another or used in conjunction with one another where applicable.

Figure 18:
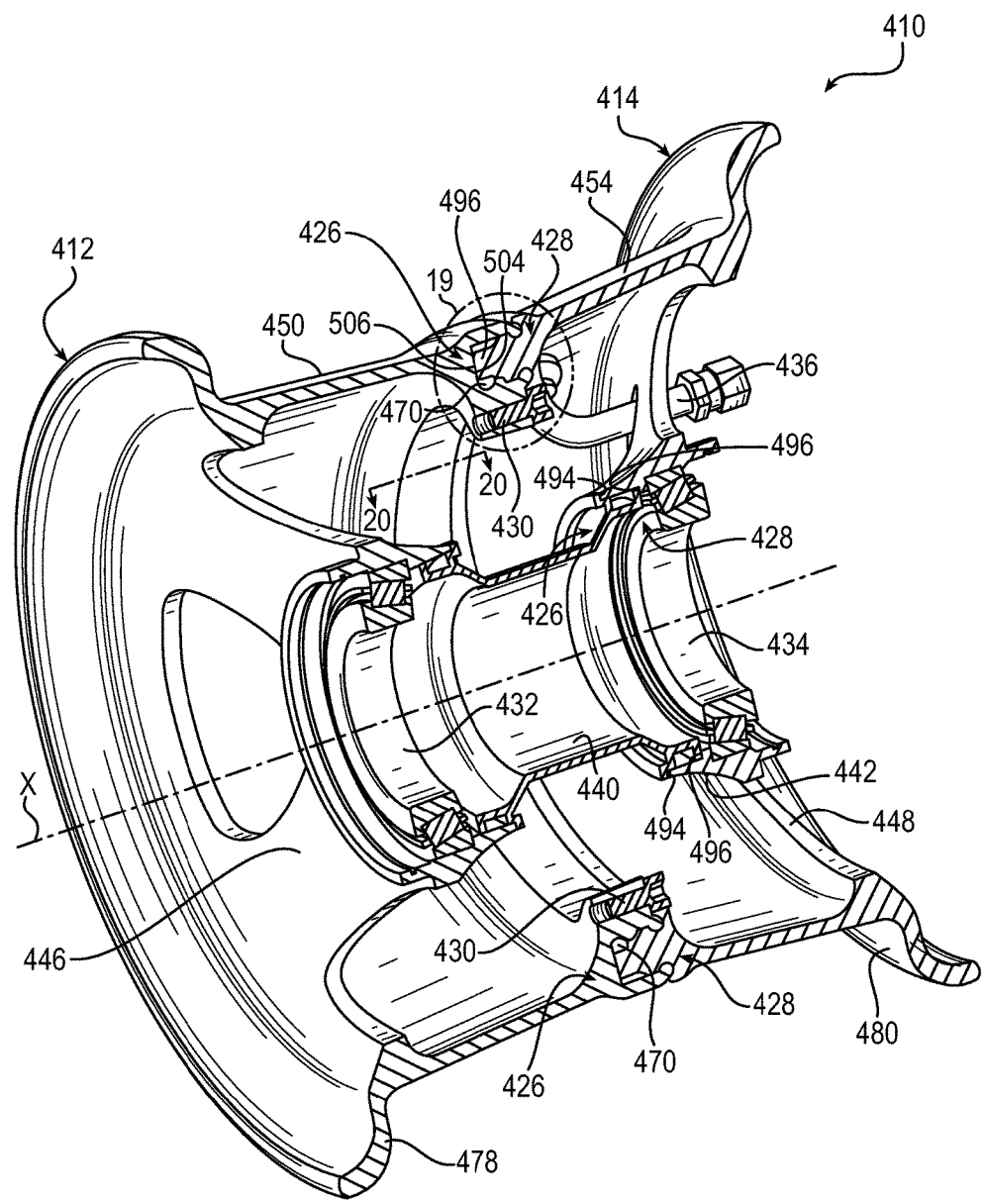
FIG. 18 is a perspective view of still another exemplary aircraft wheel assembly according to the invention, with an angular portion removed to show cross section detail of the inboard and outboard wheel components.
Figure 19:
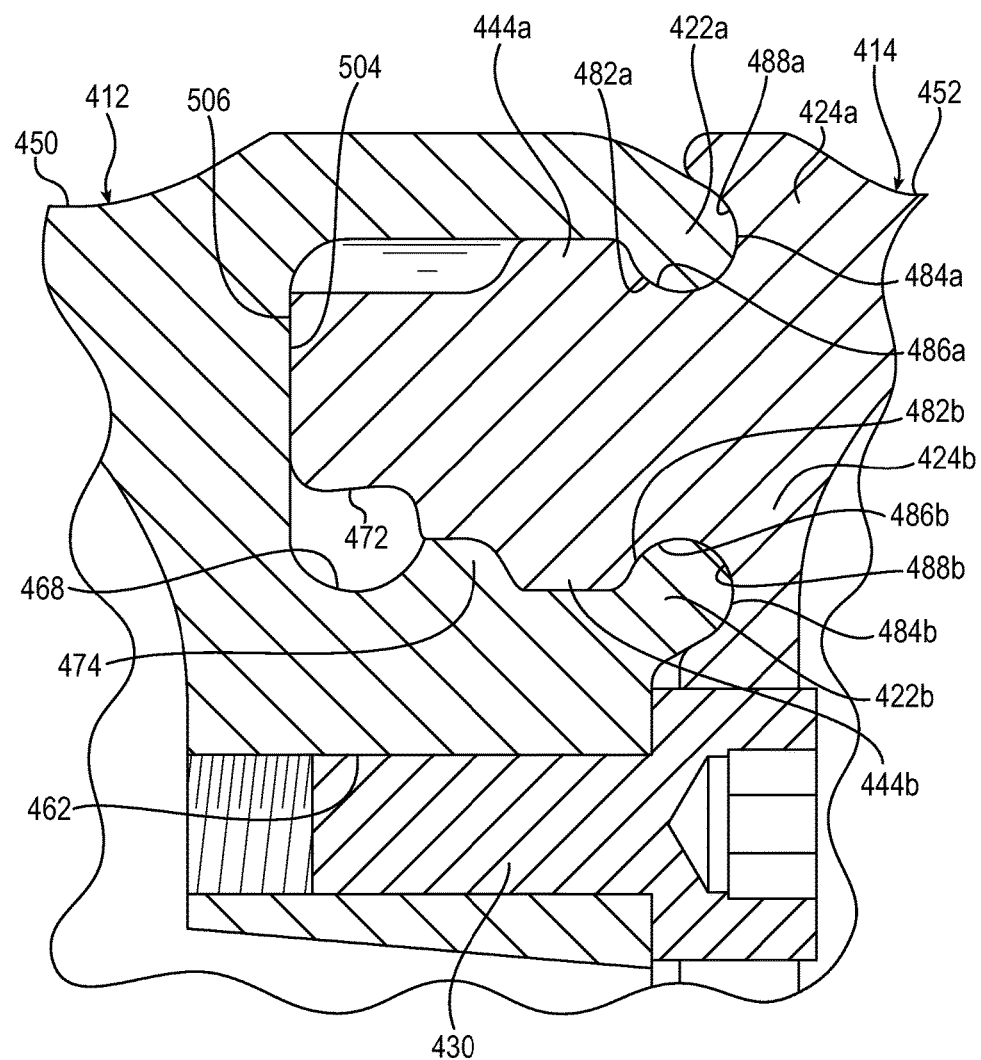
FIG. 19 is an axial sectional view of a portion of the aircraft wheel assembly of FIG. 18, as as viewed from the dashed circle line labeled 19 in FIG. 18, showing the interface between components in greater detail.
Figure 20:
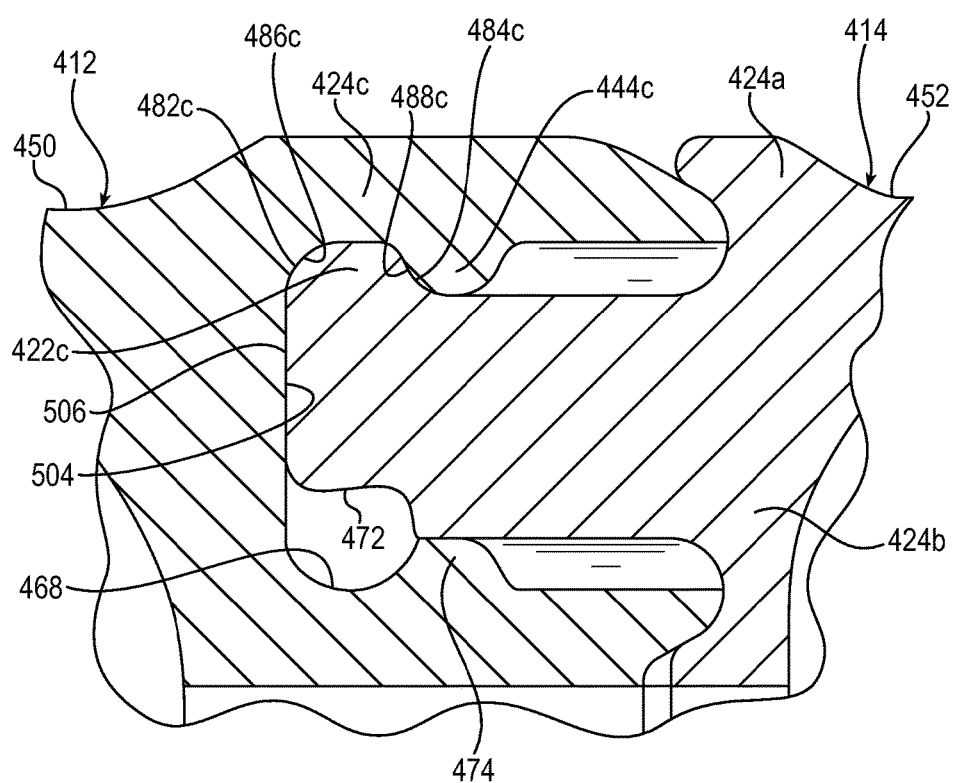
FIG. 20 is an axial sectional view of a portion of the aircraft wheel assembly of FIG. 18, as viewed from line 20-20 in FIG. 18, showing the interface between components in greater detail.
Figure 21:
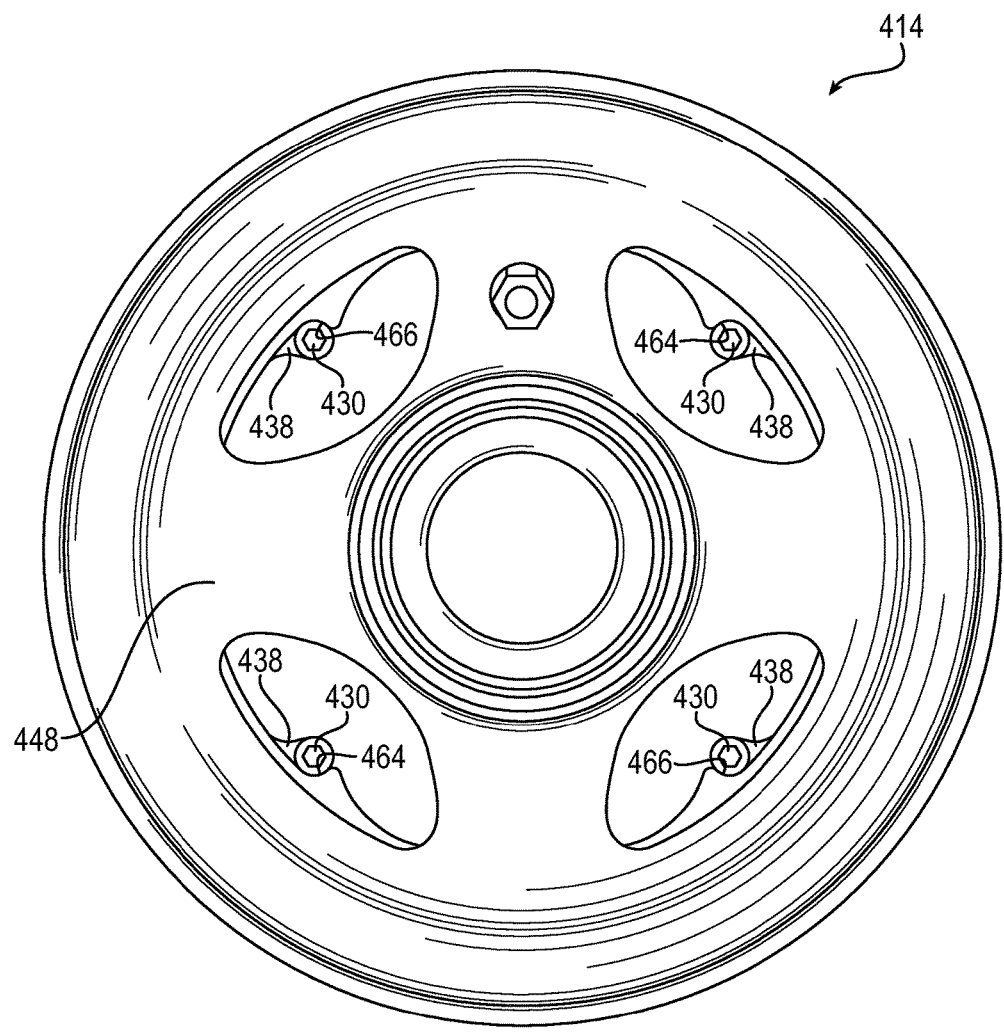
FIG. 21 is an axial end view of the aircraft wheel assembly of FIG. 18, showing clocking retention features.
Figure 22:
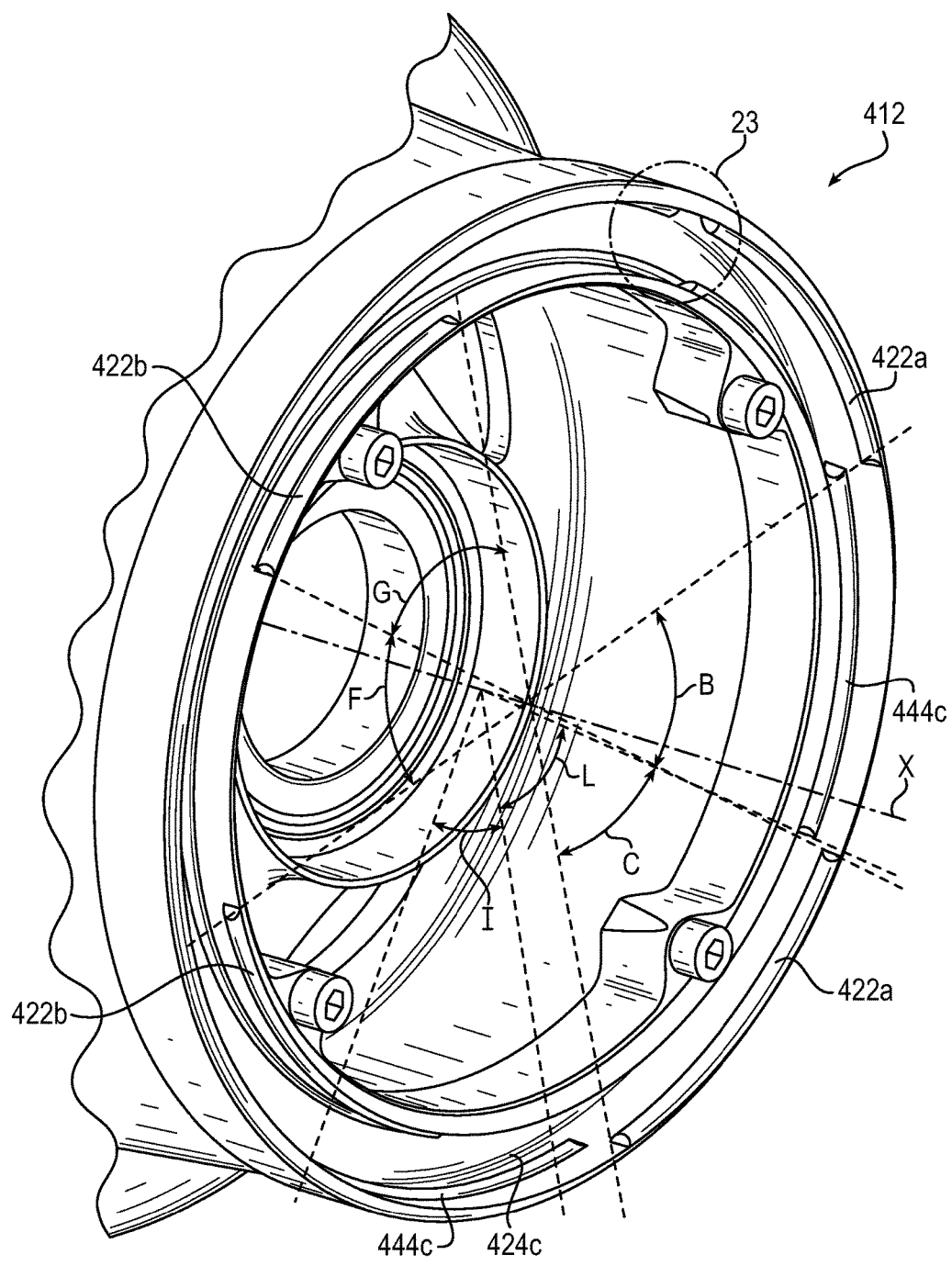
FIG. 22 is a perspective view of an inboard wheel component of the FIG. 18 aircraft wheel assembly.
Figure 23:
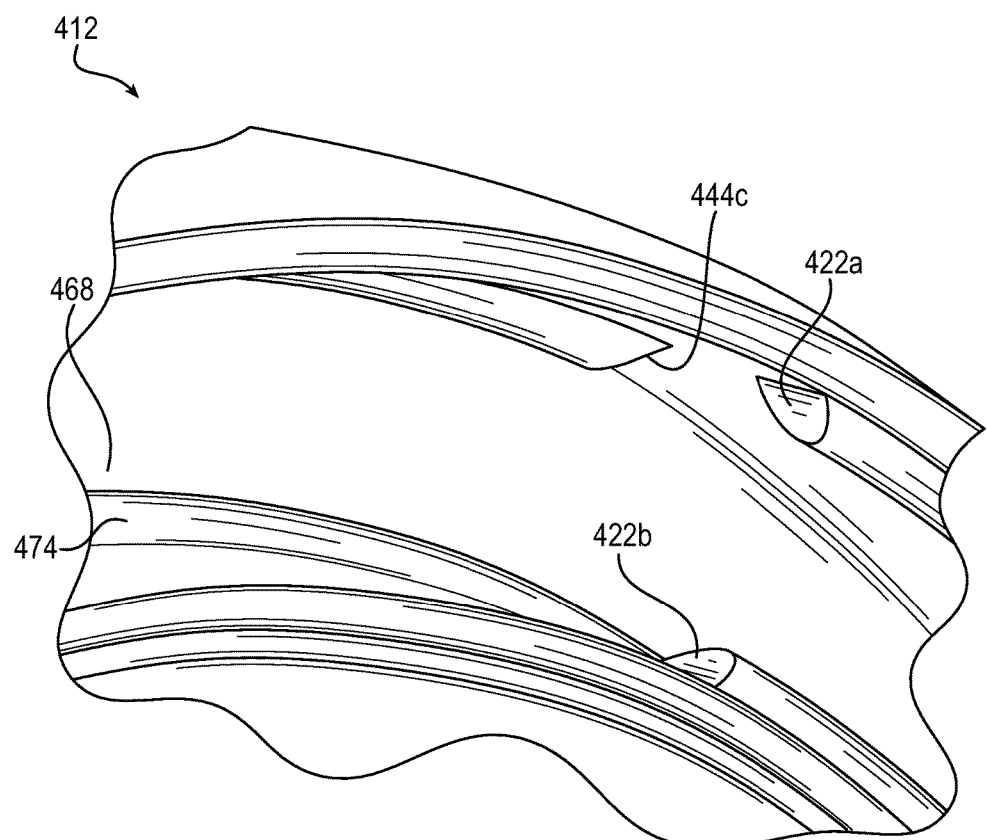
FIG. 23 is an exploded perspective view of an interface element portion of the inboard wheel component of the FIG. 18 aircraft wheel assembly.
Figure 24:
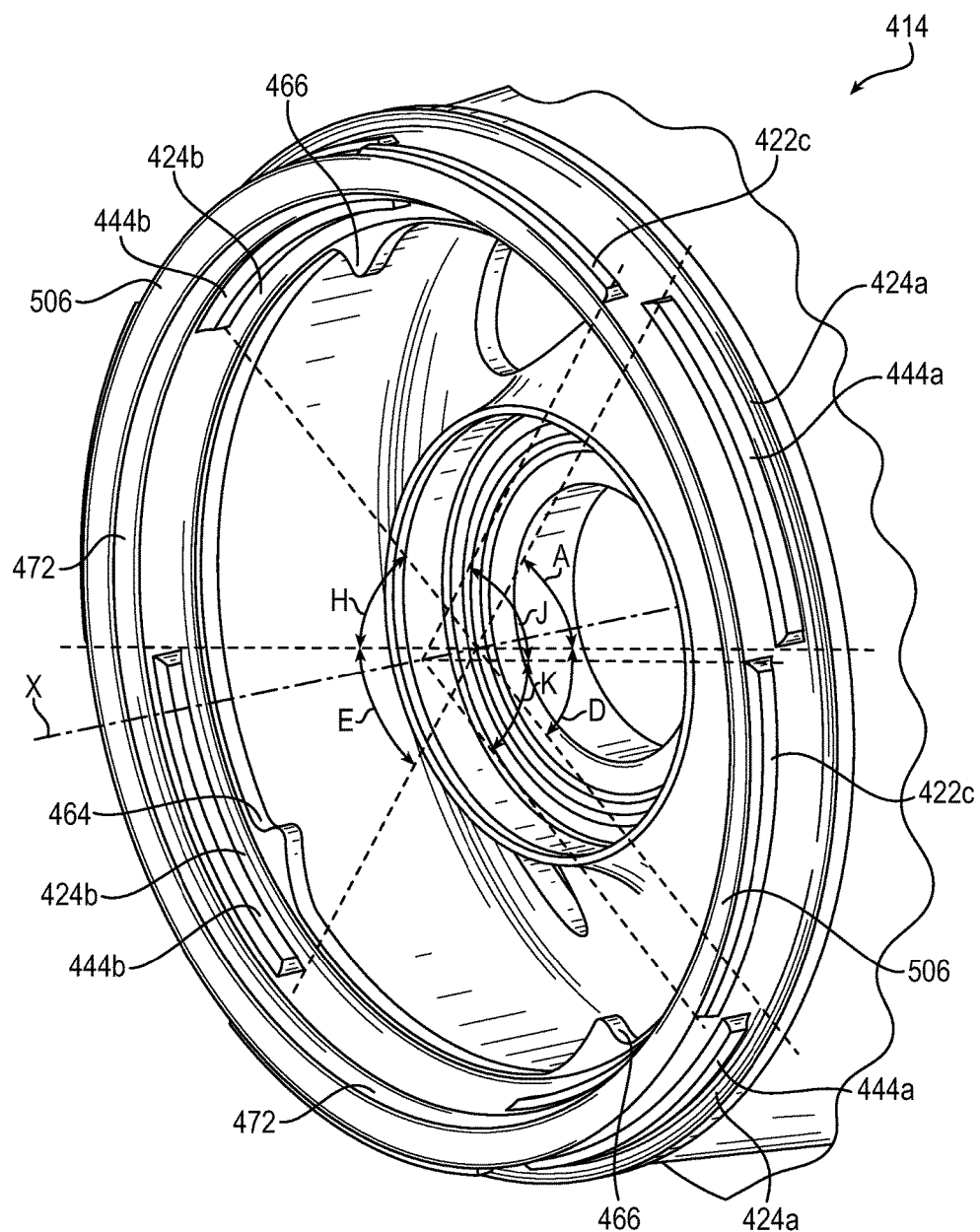
FIG. 24 is a perspective view of an outboard wheel component of the FIG. 18 aircraft wheel assembly.

The FIG. 18 wheel assembly 410 includes an inboard primary wheel component 412, best shown in FIGS. 22 and 23, and a separable outboard primary wheel component 414, best shown in FIGS. 21 and 24, which together support a tire (not shown) thereon. The inboard wheel component 412 has a plurality of outer and inner tongue interface elements 422a and 422b disposed circumferentially about an axis X of the wheel assembly 410 and shown in axial cross section in FIG. 19, and a plurality of groove interface elements 424c that are circumferentially staggered and axially spaced relative to the tongue interface elements 422a, 422b and shown in axial cross section in FIG. 20. The outboard wheel component 414 a plurality of outer and inner groove interface elements 424a and 424b disposed circumferentially about the axis X and likewise shown in axial cross section in FIG. 19, and a plurality of tongue interface elements 422c that are circumerentially staggered and axially spaced relative to the groove interface elements 424a, 424b and shown in axial cross section in FIG. 20. As shown in FIGS. 18-20, and as will be described in greater detail below, the tongue interface elements 422a, 422b, 422c and the respective groove interface elements 424a, 424b, 424c form a tongue and groove arrangement that interconnects the primary wheel components 412, 414 at respective interface regions 426, 428. With this interconnection, the interface elements 422a-422c, 424a-424c serve to structurally retain the wheel components 412, 414 in fixed relation to one another.

The clocking retention features of the FIG. 18 wheel assembly 410 include locking screw pins 430, boss portions 438 defining respective openings 462 therein, and a plurality of stops 464, 466. As will be appreciated, the clocking retention features of the FIG. 18 wheel assembly may be structurally and functionally similar to the features of the clocking retention features of the FIG. 1 wheel assembly 10 or the FIG. 11 wheel assembly 210.

As shown in FIGS. 19-20, the cylindrical wheel section 450 of the inboard wheel component 412 has a circumferentially extending groove 468 radially inward of the groove interface elements 424c to accommodate a suitable sealing component 470 (FIG. 18) such as an o-ring. The cylindrical wheel section 452 of the outboard wheel component 414 has a circumferentially extending wall 472 that captures the sealing component 470 when the wheel components 412, 414 are joined together.

In assembling the wheel assembly 410, an uninflated pneumatic tire is slid onto the inboard wheel component 410, which is shown in FIG. 22. An o-ring 470 is mounted within the groove 468. The outboard wheel component 414, shown in FIG. 24, may then be positioned to axially align its tongue interface elements 422c with the outer and inner tongue interface elements 422a, 422b of the inboard wheel component 412. Such initial axial alignment may serve as a clocking reference to the assembler. Once axially aligned, a simple series of motions including a reverse twist, an axial movement, a forward twist, a further axial movement, and a further reverse twist may be applied to the outboard wheel component 414 relative to the inboard wheel component 414 to interconnect the tongue and groove features thereof and axially align the clocking retention openings 462 with the clocking retention stops 464, 466, as is more fully described below. The locking screw pins 430 may then be installed in the clocking retention openings 462, as shown in FIG. 19, to rotationally lock the wheel components 412, 414. The pneumatic tire may then be inflated whereby the respective beads of the tire exert an outward force on the respective rim flanges 458, 460, thereby completing the assembly of the inboard and outboard wheel components 412, 414.

FIGS. 18, 19, 22 and 24 show the configuration, size, and spacing of the tongue and groove interface elements 422a-422c, 424a-424c of the primary wheel components 412, 414 as well as their interconnection. In this embodiment, the wheel components 412, 414 have multiple threads, that is, axially spaced rows, of interface elements 422a-422c, 424a-424c at a zero helix angle. In the various figures, the suffix a represents circumferentially spaced outer interface elements 422a, 424a, the suffix b represents circumferentially spaced inner interface elements 422b, 424b that are disposed radially inward of the outer interface elements 422a, 424a, and the suffix c represents circumferentially spaced interface elements 422c, 424c that are circumferentially staggered and axially spaced relative to the outer interface elements 422a, 424a and the inner interface elements 422b, 424b. As shown in FIG. 19, the outer tongue interface elements 422a may radially oppose the inner tongue interface elements 422b, and the outer groove interface elements 424a may radially oppose the inner groove interface elements 424b. As shown in FIGS. 19 and 22, the outer and inner tongue interface elements 422a, 422b of the inboard wheel component 412 and the outer and inner groove interface elements 424a, 424b of the outboard wheel component 414 lie in a first axial plane. As shown in FIGS. 19, 20 and 24, the groove interface elements 424c of the inboard wheel component 412 and the tongue interface elements 422c of the outboard wheel component 414 lie in a second axial plane that is axially spaced from the first axial plane. As shown in FIGS. 18 and 19, the twist and lock interconnections may be configured such that the tongue and groove interface elements 422a and 424a circumferentially align with the tongue and groove interface elements 422b and 424b, and such that the tongue and groove interface elements 422a and 424a radially oppose the tongue and groove interface elements 422b and 424b.

The tongue interface elements 422a and 422b of the inboard wheel component 412 may number in four and be equally circumferentially spaced about the axis X, and the groove interface elements 424a and 424b of the outboard wheel component 414 may likewise number in four and be equally circumferentially spaced about the axis X. As can be seen from FIGS. 19, 21, 22 and 24, this may yield an equal circumferential distribution of the tongue and groove interconnections of the interface elements 422a and 424a and the tongue and groove interconnections of the interface elements 422b and 424b. The tongue interface elements 422c of the outboard wheel component 414 may number in four and be equally circumferentially spaced about the axis X, and the groove interface elements 424c of the inboard wheel component 412 may likewise number in four and be equally circumferentially spaced about the axis X. As can be seen from FIGS. 20-22 and 24, this may yield an equal circumferential distribution of the tongue and groove interconnections of the interface elements 422c and 424c. In the FIG. 18 wheel assembly 410, the tongue and groove interconnections of the interface elements 422a and 424a (FIG. 19), and 422b and 424b (FIG. 19), may be circumferentially staggered relative to the tongue and groove interconnections of the interface elements 422c and 424c (FIG. 20) by 45 degrees.

As shown in FIGS. 22 and 24, the angular span A of the groove interface elements 424a may be less than the angular span B of the spacing between circumferentially adjacent tongue interface elements 422a, and the angular span C of the tongue interface elements 422a may be less than the angular span D of the spacing between circumferentially adjacent groove interface elements 424a. Likewise, the angular span E of the groove interface elements 424b may be less than the angular span F of the spacing between circumferentially adjacent tongue interface elements 422b, and the angular span G of the tongue interface elements 422b may be less than the angular span H of the spacing between circumferentially adjacent groove interface elements 424b. Further, the angular span I of the groove interface elements 424c may be less than the angular span J of the spacing between circumferentially adjacent tongue interface elements 422c, and the angular span K of the tongue interface elements 422c may be less than the angular span L of the spacing between circumferentially adjacent groove interface elements 424c.

In the non-limiting example of the FIGS. 15 and 17 primary wheel components 412, 414, the angular spans A, C, E, G, I and K of the respective interface elements 424a, 422a, 424b, 422b, 424c and 422c may be 44 degrees while the angular spans B, D, F, H, J and L of the spacings may be 46 degrees. This sizing and spacing enables the groove interface elements 424a, 424b, 424c and the tongue interface elements 422a, 422b, 422c to be axially moved or slid relative to one another when for example the interface elements 424a, 422a, 424b, 422b, 424c, 422c are axially aligned with the respective angular spacings B, D, F, H, J and L.

The tongue and groove interface elements 422a-422c, 424a-424c enable the aforementioned simple reverse twist, axial movement, forward twist, further axial movement, and further reverse twist scheme of assembling the primary wheel components 412, 414. As an initial clocking reference, the assembler may axially align the tongue interface elements 422c of the outboard wheel component 414 with the outer tongue interface elements 422a of the inboard wheel component 412. For the FIG. 18 embodiment, this also has the effect of axially aligning the groove interface elements 424a of the outboard wheel component 414 with the groove interface elements 424c of the inboard wheel component 412.

From this initial reference, a reverse twist may be applied. The assembler may rotate the outboard wheel component 414 in a reverse direction, for example counterclockwise, about the axis X until the groove interface elements 424a, 424b axially align with the tongue interface elements 422a, 422b, and the tongue interface element 422c axially aligns with the thread portion or rib 444c of the groove interface element 424c. Here, owing to the angular spans A, C, E, G, I, K of the interface elements 424a, 422a, 424b, 422b, 424c, 422c being 44 degrees and the angular spans of the spacings B, D, F, H, J, L being 46 degrees, the amount of reverse rotation to axially align the interface elements 424a, 424b and 422c with the respective interface elements 422a, 422b and 424c may be 45 degrees with a clearance of one degree on opposite angular sides of the interface elements 424a, 424b and 422c.

Once the outboard wheel component 414 has been reverse rotated relative to the inboard wheel component 412, a first axial movement of the outboard wheel component 414 toward the inboard wheel component 412 may then be applied until the bottom thread portions or ribs 444a, 444b of the respective groove interface elements 424a, 424b of the outboard wheel component 414 abut or seat in rotationally sliding relationship with the top portions of the tongue interface elements 422a, 422b of the inboard wheel component 412.

Once the outboard wheel component 414 has been moved the first axial movement, a forward twist may then be applied to the outboard wheel component 414. The assembler may rotate the outboard wheel component 414 in a forward direction, for example clockwise, about the axis X until the groove interface elements 424a, 424b axially align with the spacings B, F between the tongue interface elements 422a, 422b, and the tongue interface elements 422c axially align with the spacings L between the tongue interface elements 424c.

Once the outboard wheel component 414 has been forward rotated relative to the inboard wheel component 412, a further or second axial movement may then be applied to axially move the outboard wheel component 414 so as to align the circumferential ends of the tongue and groove features. The assembler may axially move the outboard wheel component 414 toward the inboard wheel component 412, effectively axially inserting the groove interface elements 424a and 424b between the respective tongue interface elements 422a and 422b, that is, into the respective spacings B and F of the inboard wheel component 412, and inserting the tongue interface elements 422c between the groove interface elements 424c, that is, into the spacings L of the inboard wheel component 412. The axial movement may be made until the circumferential ends of the tongue interface elements 422a, 422b, 422c align with the respective circumferential ends of the groove interface elements 424a, 424b, 424c for example in the following manner. As shown in FIGS. 19 and 20, the tongue interface elements 422a and 422b may have a semicircular or bulbous shape in circumferential end view that corresponds to a semicircular or bulbous shape in circumferential end view of the grooves defined by the groove interface elements 424a and 424b, and the tongue interface elements 422c may have a slightly elongated rounded shape in circumferential end view that corresponds to a slightly elongated rounded shape in circumferential end view of the grooves defined by the groove interface elements 424c. The circumferential ends of the tongue interface elements 422a, 422b, 422c may be aligned with the circumferential ends of the groove interface elements 424a, 424b, 424c when their respective circumferential end view shapes align, that is, when inward and outward interfaces 482a, 484a of the tongue interface elements 422a align with inward and outward interfaces 486a, 488a of the groove interface elements 424a, and inward and outward interfaces 482b, 484b of the tongue interface elements 422b align with inward and outward interfaces 486b, 488b of the groove interface elements 424b, and inward and outward interfaces 482c, 484c of the tongue interface elements 422c align with inward and outward interfaces 486c, 488c of the groove interface elements 424c.

It will be appreciated that the alignment of the circumferential ends of the tongue interface elements 422a, 422b, 422c with the circumferential ends of the groove interface elements 424a, 424b, 424c may be realized or supplemented by other means. For example, in the FIG. 18 wheel assembly 410, the circumferential ends of the tongue interface elements 422a, 422b, 422c may align with the circumferential ends of the groove interface elements 424a, 424b, 424c when the outboard wheel component 414 is axially seated relative to the inboard wheel component 412, which may be at the hub portions 440, 442 and/or the cylindrical wheel sections 450, 452 of the wheel components 412, 414. As shown in FIGS. 18-20, an end of the hub portion 442 of the outboard wheel component 414 may slidably fit within an end of the hub portion 440 of the inboard wheel component 412. A distal end of the hub portion 442 may abut an interior circumferential ledge 494 of the hub portion 440, and a distal end of the hub portion 440 may abut an interior circumferential ledge 496 of the hub portion 442. The ledges 494, 496 may thus serve as axial movement stops to prevent further axial movement of, for example, the outboard wheel component 414 onto the inboard wheel component 412, and further as cirumferential alignment mechanisms to align the circumferential ends of the tongue interface elements 422a, 422b, 422c with the circumferential ends of the groove interface elements 424a, 424b, 424c. As is also shown in FIGS. 18-20, a distal end 504 of the cylindrical wheel section 450 may abut a distal end 506 of the cylindrical wheel section 452. The distal ends 504, 506 thus may also serve as axial movement stops to prevent further axial movement of, for example, the outboard wheel component 414 onto the inboard wheel component 412, and further as cirumferential alignment mechanisms to align the circumferential ends of the tongue interface elements 422a, 422b, 422c with the circumferential ends of the groove interface elements 424a, 424b, 424c.

Once the outboard wheel component 414 has been further axially moved relative to the inboard wheel component 412 so as to align the circumferential ends of the tongue interface elements 422a, 422b, 422c with the circumferential ends of the groove interface elements 424a, 424b, 424c, a further or second reverse twist may then be applied. The assembler may rotate the outboard wheel component 414 in a reverse direction, for example counterclockwise, about the axis X until the interface elements 424a, 424b, 424c interconnect with the interface elements 422a, 422b, 422c over their respective angular spans A, E, I and C, G, K and the clocking retention boss portions 438 and openings 462 of the inboard wheel component 412 align with the clocking retention stops 464, 466 of the outboard wheel component 414. Once clocked in this position, the assembler may then install the locking screw pins 430 in the clocking retention openings 462 to rotationally lock the outboard wheel component 414 relative to the inboard wheel component 412.

Referring to FIGS. 18 and 19, the primary wheel components 412, 414 react structural tire loads and pressure through the engagement of the groove interface elements 424a, 424b, 424c with the tongue interface elements 422a, 422b, 422c. As shown in FIG. 19, the tongue and groove arrangement may prevent relative axial movement between the wheel components 412, 414, for example, by the inward interfaces 486a, 486b, 486c of the groove interface elements 424a, 424b, 424c abutting the inward interfaces 482a, 482b, 482c of the tongue interface elements 422a, 422b, 422c.

As will be appreciated, as with the FIG. 1 aircraft wheel assembly 10 and the FIG. 11 aircraft wheel assembly 210, the FIG. 18 aircraft wheel assembly 410 may have many potential assembly schemes that may comprise combinations of forward (for example clockwise) or reverse (for example counterclockwise) movements and axial advances, the above described reverse twist, axial movement, forward twist, further axial movement, and further reverse twist scheme being only one example. The aircraft wheel assembly 410 is not limited to a reverse twist, axial movement, forward twist, further axial movement, and further reverse twist scheme as above described, and other embodiments are contemplated.

For example, in an embodiment the assembler may install two locking screw pins 430 in two 180 degrees opposed clocking retention openings 462, followed by axially aligning the clockwise clocking retention stops 464 with the installed locking screw pins 430, followed by a first axial movement of the outboard wheel component 414 toward the inboard wheel component 412 until the bottom thread portions or ribs 444a, 444b of the respective groove interface elements 424a, 424b of the outboard wheel component 414 abut or seat in rotationally sliding relationship with the top portions of the tongue interface elements 422a, 422b of the inboard wheel component 412, followed by a reverse rotation of the outboard wheel component 414 relative to the inboard wheel component 412 until the groove interface elements 424a, 424b axially align with the spacings B, F between the tongue interface elements 422a, 422b, and the tongue interface elements 422c axially align with the spacings L between the tongue interface elements 424c, followed by a second axial movement of the outboard wheel component 414 toward the inboard wheel component 412 until the circumferential ends of the tongue interface elements 422a, 422b, 422c align with the respective circumferential ends of the groove interface elements 424a, 424b, 424c, followed by a forward rotation of the outboard wheel component 414 relative to the inboard wheel component 412 until the clockwise clocking retention stops 464 abut the installed locking screw pins 430, the forward rotation serving to interconnect the groove interface elements 424a, 424b, 424c with the tongue interface elements 422a, 422b, 422c. The assembler may then install the other two locking screw pins 430 in the two 180 degrees opposed clocking retention openings 462 aligned with the counterclockwise clocking retention stops 466, thereby locking the outboard wheel component 414 relative to the inboard wheel component 412.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An aircraft wheel assembly comprising:
   first and second hub components having an axis and respective first and second wheel sections and respective first and second sets of circumferentially spaced apart interface elements protruding radially from the respective first and second wheel sections;
   wherein the first and second hub components are rotatable relative to one another about the axis between a first position in which the first set of interface elements is axially movable relative to the second set of interface elements and a second position in which the first set of interface elements axially overlaps the second set of interface elements to axially lock the first hub component relative to the second hub component to prevent relative axial movement between the first and second hub components,
   wherein in the axially locked second position, first interfaces of the respective first set of radially protruding interface elements are in axially abutting engagement with second interfaces of the respective second set of radially protruding interface elements such that the first and second hub components react structural tire loads and pressure through the engagement of the first and second sets of radially protruding interface elements,
   wherein said abutting engagement is between an axially outer surface of the respective first set of interface elements and an axially inner surface of the respective second set of interface elements, and
   wherein the abutting engagement occurs at respective ends opposite of respective rim flanges of the first and second wheel sections further comprising a lock that is configured to prevent rotational movement of the first hub component relative to the second hub component when the first and second hub components are in the second position wherein said lock is disposed radially inward of the abutting engagement.

2. The aircraft wheel assembly of claim 1, further comprising a lock that is configured to prevent rotational movement of the first hub component relative to the second hub component when the first and second hub components are in the second position.

3. The aircraft wheel assembly of claim 2, wherein the lock includes a pin.

4. The aircraft wheel assembly of claim 3, wherein the pin projects through openings in the respective first and second interface elements.

5. The aircraft wheel assembly of claim 1, wherein the first and second sets of interface elements form a male and female thread interface having a helix angle.

6. The aircraft wheel assembly of claim 5, wherein the helix angle is zero degrees.

7. The aircraft wheel assembly of claim 1, wherein the first hub component includes an inboard wheel component and the second hub component includes an outboard wheel component.

8. The aircraft wheel assembly of claim 1, wherein each of the first and second sets of interface elements includes four interface elements.

9. The aircraft wheel assembly of claim 1, wherein the interface elements of the first set of interface elements are equally circumferentially spaced apart.

10. The aircraft wheel assembly of claim 1, wherein in the second position the first and second sets of interface elements form a tongue and groove joint.

11. The aircraft wheel assembly of claim 10, wherein the first set of interface elements includes tongue interface elements and the second set of interface elements includes groove interface elements.

12. The aircraft wheel assembly of claim 1, wherein the first and second hub components include respective third and fourth sets of circumferentially spaced apart interface elements.

13. The aircraft wheel assembly of claim 12, wherein in the first position the third set of interface elements is axially movable relative to the fourth set of interface elements and in the second position the third set of interface elements axially overlaps the fourth set of interface elements to prevent axial movement of the first hub component relative to the second hub component.

14. The aircraft wheel assembly of claim 12, wherein the third and fourth sets of interface elements are respectively axially staggered relative to the first and second sets of interface elements.

15. The aircraft wheel assembly of claim 12, wherein the third and fourth sets of interface elements are respectively axially in the same plane as the first and second sets of interface elements.

16. The aircraft wheel assembly of claim 12, wherein the interface elements of the third set of interface elements radially oppose the interface elements of the first set of interface elements.

17. The aircraft wheel assembly of claim 12, wherein the first and second hub components include respective fifth and sixth sets of circumferentially spaced apart interface elements.

18. The aircraft wheel assembly of claim 17, wherein in the first position the fifth set of interface elements is axially movable relative to the sixth set of interface elements and in the second position the fifth set of interface elements axially overlaps the sixth set of interface elements to prevent axial movement of the first hub component relative to the second hub component.

19. The aircraft wheel assembly of claim 17, wherein the fifth and sixth sets of interface elements are respectively circumferentially staggered relative to the first and second sets of interface elements.

20. An aircraft wheel assembly comprising:
first and second wheel components having an axis and respective first and second wheel sections and respective circumferentially disposed tongue and groove engaging portions that protrude radially from the respective first and second wheel sections;
wherein the tongue and groove engaging portions are interconnectable to form circumferentially disposed tongue and groove joints that axially lock the first and second wheel components to prevent relative axial movement between the first and second wheel components,
wherein in the axially locked position, first interfaces of the respective radially protruding tongue engaging portions are in axially abutting engagement with second interfaces of the respective radially protruding groove engaging portions such that the first and second wheel components react tire loads and pressure through the engagement of the respective radically protruding tongue engaging portions and groove engaging portions,
wherein said abutting engagement is between an axially outer surface of the respective tongue engaging portions and an axially inner surface of the respective groove engaging portions, and
wherein the abutting engagement occurs at respective ends opposite of respective rim flanges of the first and second wheel sections, further comprising a lock that is configured to prevent rotational movement of the first wheel component relative to the second wheel component when the first and second wheel components are in the axially locked position wherein said lock is disposed radially inward of the abutting engagement.

21. The aircraft wheel assembly of claim 20, wherein the groove engaging portions are configured to slidably circumferentially receive therein the respective tongue portions.

22. The aircraft wheel assembly of claim 20, wherein the first wheel component includes an inboard wheel component and the second wheel component includes an outboard wheel component.

23. The aircraft wheel assembly of claim 20, wherein the tongue engaging portions are on an inside diameter of the first wheel component and the groove engaging portions are on an outside diameter of the second wheel component.

24. The aircraft wheel assembly of claim 20, wherein the tongue engaging portions have a round shape in circumferential end view, and the grooves of the groove engaging portions have a round shape in circumferential end view.

25. A method of assembling an aircraft wheel comprising:
providing first and second hub components having an axis and respective first and second wheel sections and respective first and second sets of circumferentially spaced apart interface elements protruding radially from the respective first and second wheel sections
moving the first set of circumferentially spaced apart radially protruding interface elements of the first hub component axially relative to the second set of circumferentially spaced apart radially protruding interface elements of the second hub component,
wherein the first hub component is an inboard primary wheel component having a first annular rim flange and the second hub component is an outboard primary wheel component having a second annular rim flange, which first and second annular rim flanges are configured to support respective beads of a tire thereon such that when the tire is inflated the beads of the tire exert an outward force on the respective first and second rim flanges, or the first hub component is an outboard primary wheel component having a first annular rim flange and the second hub component is an inboard primary wheel component having a second annular rim flange, which first and second annular rim flanges are configured to support respective beads of a tire thereon such that when the tire is inflated the beads of the tire exert an outward force on the respective first and second rim flanges; and
rotating the first hub component relative to the second hub component until the first set of radially protruding interface elements axially overlaps the second set of radially protruding interface elements to axially lock the first hub component relative to the second hub component to prevent relative axial movement between the first and second hub components,
wherein in the axially locked position, first interfaces of the respective first set of radially protruding interface elements are in axially abutting engagement with second interfaces of the respective second set of radially protruding interface elements such that the first and second hub components react structural tire loads and pressure through the engagement of the first and second sets of radially protruding interface elements,
wherein said abutting engagement is between an axially outer surface of the respective first set of interface elements and an axially inner surface of the respective second set of interface elements, and
wherein the abutting engagement occurs at respective ends opposite of said respective first and second rim flanges of the first and second wheel sections, further comprising a lock that is configured to prevent rotational movement of the first hub component relative to the second hub component when the first and second hub components are in the axially locked position wherein said lock is disposed radially inward of the abutting engagement.

26. The method of claim 25, wherein the first and second sets of interface elements are axially moved until the circumferentially spaced apart interface elements of the second hub component align in circumferential end view with the circumferentially spaced apart interface elements of the first hub component.

27. The method of claim 25, wherein the first set of interface elements includes tongue interface elements and the second set of interface elements includes groove interface elements, and the rotating of the first hub component relative to the second hub component includes interconnecting the tongue and groove interface elements to form circumferentially spaced tongue and groove joints.

* * * * *